(12) United States Patent
Xie et al.

(10) Patent No.: US 11,967,072 B2
(45) Date of Patent: Apr. 23, 2024

(54) THREE-DIMENSIONAL OBJECT SEGMENTATION OF MEDICAL IMAGES LOCALIZED WITH OBJECT DETECTION

(71) Applicant: Genentech, Inc., South San Francisco, CA (US)

(72) Inventors: Luke Xie, South San Francisco, CA (US); Kai Henrik Barck, South San Francisco, CA (US); Omid Bazgir, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 60 days.

(21) Appl. No.: 17/665,932

(22) Filed: Feb. 7, 2022

(65) Prior Publication Data
US 2022/0230310 A1 Jul. 21, 2022

Related U.S. Application Data

(63) Continuation of application No. PCT/US2020/046239, filed on Aug. 13, 2020.
(Continued)

(51) Int. Cl.
*G06T 7/00* (2017.01)
*G06T 7/10* (2017.01)
(Continued)

(52) U.S. Cl.
CPC ............ *G06T 7/0012* (2013.01); *G06T 7/10* (2017.01); *G06T 7/62* (2017.01); *G06T 7/70* (2017.01);
(Continued)

(58) Field of Classification Search
CPC ........... G06T 7/0012; G06T 7/10; G06T 7/62; G06T 7/70; G06T 2200/04;
(Continued)

(56) References Cited

U.S. PATENT DOCUMENTS

| 6,909,805 B2 * | 6/2005 | Ma ...................... G06V 30/413 382/229 |
| 2016/0189373 A1 * | 6/2016 | Park ..................... G06T 7/187 382/131 |

(Continued)

FOREIGN PATENT DOCUMENTS

| WO | 2014/115151 A1 | 7/2014 |
| WO | 2019/136349 A3 | 7/2019 |

OTHER PUBLICATIONS

Avants, et al., "An Open Source Multivariate Framew ork For n-Tissue Segmentation with Evaluation on Public Data," *Neuroinformatics*, 9(4), PMC3297199, 381-400, Dec. 2011.
(Continued)

*Primary Examiner* — Siamak Harandi
(74) *Attorney, Agent, or Firm* — Kilpatrick Townsend & Stockton LLP

(57) ABSTRACT

The present disclosure relates to techniques for segmenting objects within medical images using a deep learning network that is localized with object detection based on a derived contrast mechanism. Particularly, aspects are directed to localizing an object of interest within a first medical image having a first characteristic, projecting a bounding box or segmentation mask of the object of interest onto a second medical image having a second characteristic to define a portion of the second medical image, and inputting the portion of the second medical image into a deep learning model that is constructed as a detector using a weighted loss function capable of segmenting the portion of the second medical image and generating a segmentation boundary around the object of interest. The segmentation boundary may be used to calculate a volume of the object of interest for determining a diagnosis and/or a prognosis of a subject.

17 Claims, 8 Drawing Sheets

Related U.S. Application Data

(60) Provisional application No. 62/886,844, filed on Aug. 14, 2019.

(51) Int. Cl.
| | | |
|---|---|---|
| *G06T 7/62* | (2017.01) | |
| *G06T 7/70* | (2017.01) | |
| *G06V 10/75* | (2022.01) | |
| *G06V 10/764* | (2022.01) | |
| *G06V 20/64* | (2022.01) | |

(52) U.S. Cl.
CPC .......... *G06V 10/758* (2022.01); *G06V 10/764* (2022.01); *G06V 20/64* (2022.01); *G06T 2200/04* (2013.01); *G06T 2207/20081* (2013.01); *G06T 2207/20084* (2013.01)

(58) Field of Classification Search
CPC . G06T 2207/20081; G06T 2207/20084; G06T 2207/30004; G06T 7/174; G06T 7/12; G06T 7/73; G06T 2207/10081; G06T 2207/10088; G06T 2207/10101; G06T 2207/10104; G06V 10/758; G06V 10/764; G06V 20/64; G06V 2201/031; G06N 3/08; G06N 3/045; G06N 3/047; G06F 18/241; G06F 18/2415
See application file for complete search history.

(56) References Cited

U.S. PATENT DOCUMENTS

| | | | |
|---|---|---|---|
| 2017/0014108 A1* | 1/2017 | Mazurowski | G06T 7/0012 |
| 2018/0330207 A1* | 11/2018 | Zhou | G06T 7/0014 |
| 2019/0272634 A1* | 9/2019 | Li | G06T 7/0012 |
| 2019/0295260 A1* | 9/2019 | Mehta | G06N 3/045 |

OTHER PUBLICATIONS

Cicek; et al., "3D U-Net: learning dense volumetric segmentation from sparse annotation." *International conference on medical image computing and computer-assisted intervention*, pp. 424-432, Jun. 2016.

Kim, et al., "Accurate Image Super-Resolution Using Very Deep Convolutional Networks," 2016 *ieee Conference on Computer Vision and Pattern Recognition* (Cvpr), arXiv:1511.04587v2, 1646-1654, Nov. 2016.

Milletari; et al., "V-Net: Fully Convolutional Neural Networks for Volumetric Medical Image Segmentation," *Proceedings of 2016 Fourth International Conference on 3d Vision (3dv)*, pp. 565-571, Jun. 2016.

Ronneberger; et al. "U-Net: Convolutional Networks for Biomedical Image Segmentation," Medical Image Computing and Computer-Assisted Intervention, Pt Iii, 9351, pp. 234-241, May 2015.

Sudre, et al., "Generalized Dice Overlap as a Deep Learning Loss Function for Highly Unbalanced Segmentations," *Deep Learning in Medical Image Analysis and Multimodal Learning for Clinical Decision Support*, arXiv:1707.03237v3, 240-248 Jul. 2017.

International Application No. PCT/US2020/046239 , "International Search Report and Written Opinion", dated Oct. 30, 2020, 15 pages.

\* cited by examiner

THREE-DIMENSIONAL OBJECT SEGMENTATION OF MEDICAL IMAGES LOCALIZED WITH OBJECT DETECTION

CROSS-REFERENCE TO RELATED APPLICATIONS

The present application is a continuation of International Patent Application No. PCT/US2020/046239, filed on Aug. 13, 2020, which claims priority and benefit from U.S. Provisional Application No. 62/886,844, filed on Aug. 14, 2019, the contents of which are incorporated herein by reference in their entirety for all purposes.

FIELD

The present disclosure relates to automated object segmentation of medical images, and in particular to techniques for segmenting objects within medical images using a deep learning network that is localized with object detection based on a derived contrast mechanism.

BACKGROUND

Computer vision involves working with digital images and videos to deduce some understanding of contents within these images and videos. Object recognition is associated with computer vision and refers to a collection of related computer vision tasks that involve identifying objects present in an image frame. The tasks include image classification, object localization, object detection, and object segmentation. Image classification involves predicting the class of one or more objects in an image frame. Object localization refers to identifying the location of one or more objects in an image frame and drawing abounding box around their extent. Object detection combines these two tasks and localizes and classifies one or more objects in an image frame. Object segmentation involves highlighting the specific pixels (generating a mask) of the localized or detected objects instead of a coarse bounding box. Techniques for object recognition generally fall into either machine learning-based approaches or deep learning-based approaches. For machine learning-based approaches to object localization and detection, features within images are initially defined using a feature descriptor such as Haar-like features, a scale invariant feature transform, or a histogram of oriented gradients (HOG), then objects of interest are detected using a technique such as a support vector machine (SVM) based on the feature descriptor. On the other hand, deep learning techniques are able to perform end-to-end object detection and segmentation without specifically defining features, and are typically based on a convolutional neural networks (CNN) such as regional-based networks (R-CNN, Fast R-CNN, Faster R-CNN, and cascade R-CNN).

SUMMARY

In some embodiments, a computer-implemented method for segmenting objects within medical images is provided. The method includes: obtaining medical images of a subject, the medical images include a first image having a first characteristic and a second image having a second characteristic, where the medical images are generated using one or more medical imaging modalities; locating and classifying, using a localization model, objects within the first image into a plurality of object classes, where the classifying assigns sets of pixels or voxels of the first image into one or more of the plurality of object classes; determining, using the localization model, a bounding box or segmentation mask for an object of interest within the first image based on sets of pixels or voxels assigned with an object class of the plurality of object classes; transferring the bounding box or the segmentation mask onto the second image to define a portion of the second image comprising the object of interest; inputting the portion of the second image into a three-dimensional neural network model constructed for volumetric segmentation using a weighted loss function; generating, using the three-dimensional neural network model, an estimated segmentation boundary around the object of interest; and outputting, using the three-dimensional neural network, the portion of the second image with the estimated segmentation boundary around the object of interest.

In some embodiments, the one or more medical imaging modalities comprise a first medical imaging modality and a second medical imaging modality that is different from the first medical imaging modality, and where the first image is generated from the first medical imaging modality and the second image is generated from the second medical imaging modality.

In some embodiments, the one or more medical imaging modalities comprise a first medical imaging modality and a second medical imaging modality that is the same as the first medical imaging modality, and where the first image is generated from the first medical imaging modality and the second image is generated from the second medical imaging modality.

In some embodiments, the first image is a first type of image and the second image is a second type of image, and where the first type of image is different from the second type of image.

In some embodiments, the first image is a first type of image and the second image is a second type of image, and where the first type of image is the same as the second type of image.

In some embodiments, the first characteristic is different from the second characteristic.

In some embodiments, the first characteristic is the same as the second characteristic.

In some embodiments, the first medical imaging modality is magnetic resonance imaging, diffusion tensor imaging, computerized tomography, positron emission tomography, photoacoustic tomography, X-ray, sonography, or a combination thereof, and where the second medical imaging modality is magnetic resonance imaging, diffusion tensor imaging, computerized tomography, positron emission tomography, photoacoustic tomography, X-ray, sonography, or a combination thereof.

In some embodiments, the first type of image is a magnetic resonance image, a diffusion tensor image or map, a computerized tomography image, a positron emission tomography image, photoacoustic tomography image, an X-ray image, a sonography image, or a combination thereof, and where the second type of image is a magnetic resonance image, a diffusion tensor image or map, a computerized tomography image, a positron emission tomography image, photoacoustic tomography image, an X-ray image, a sonography image, or a combination thereof.

In some embodiments, the first characteristic is fractional anisotropy contrast, mean diffusivity contrast, the axial diffusivity contrast, radial diffusivity contrast, proton density contrast, T1 relaxation time contrast, T2 relaxation time contrast, diffusion coefficient contrast, low resolution, high resolution, agent contrast, radiotracer contrast, optical absorption contrast, echo distance contrast, or a combination thereof, and where the second characteristic is fractional anisotropy contrast, mean diffusivity contrast, the axial diffusivity contrast, radial diffusivity contrast, proton density contrast, T1 relaxation time contrast, T2 relaxation time contrast, diffusion coefficient contrast, low resolution, high resolution, agent contrast, radiotracer contrast, optical absorption contrast, echo distance contrast, or a combination thereof.

In some embodiments, the one or more medical imaging modalities is diffusion tensor imaging, the first image is a fractional anisotropy (FA) map, the second image is a mean diffusivity (MD) map, the first characteristic is fractional anisotropy contrast, the second characteristic is mean diffusivity contrast, and the object of interest is a kidney of the subject.

In some embodiments, the locating and classifying the objects within the first image comprises applying one or more clustering algorithms to a plurality of pixels or voxels of the first image.

In some embodiments, the one or more clustering algorithms include a k-means algorithm that assigns observations to clusters associated with the plurality of object classes.

In some embodiments, the one or more clustering algorithms further include an expectation maximization algorithm that computes probabilities of cluster memberships based on one or more probability distributions, and where the k-means algorithm initializes the expectation maximization algorithm by estimating initial parameters for each object class of the plurality of object classes.

In some embodiments, the segmentation mask is determined and the determining the segmentation mask comprises: identifying a seed location of the object of interest using the sets of pixels or voxels assigned with the object class; growing the seed location by projecting the seed location towards a z-axis representing depth of the segmentation mask; and determining the segmentation mask based on the projected seed location.

In some embodiments, determining the segmentation mask further comprises performing morphological closing and filling on the segmentation mask.

In some embodiments, the method further includes, prior to inputting the portion of the second image into the three-dimensional neural network model, cropping the second image based on the object mask plus a margin to generate the portion of the second image.

In some embodiments, the method further includes, prior to inputting the portion of the second image into the three-dimensional neural network model, inputting the second image into a deep super resolution neural network to increase resolution of the portion of the second image.

In some embodiments, the three-dimensional neural network model comprises a plurality of model parameters identified using a set of training data comprising: a plurality of medical images with annotations associated with segmentation boundaries around objects of interest; and a plurality of additional medical images with annotations associated with segmentation boundaries around objects of interest, where the plurality of additional medical images are artificially generated by matching image histograms from the plurality of medical images to image histograms from a plurality of reference maps; and where the plurality of model parameters are identified using the set of training data based on minimizing the weighted loss function.

In some embodiments, the weighted loss function is a weighted Dice loss function.

In some embodiments, the three-dimensional neural network model is a modified 3D U-Net model.

In some embodiments, the modified 3D U-Net model comprises a total number of between 5,000,000 and 12,000,000 learnable parameters.

In some embodiments, the modified 3D U-Net model comprises a total number of between 800 and 1,700 kernels.

In some embodiments, the method further includes: determining a size, surface area, and/or volume of the object of interest based on the estimated boundary around the object of interest; and providing: (i) the portion of the second image with the estimated segmentation boundary around the object of interest, and/or (ii) a size, surface area, and/or volume of the object of interest.

In some embodiments, the method further includes: determining, by a user, a diagnosis of the subject based on (i) the portion of the second image with the estimated segmentation boundary around the object of interest, and/or (ii) a size, surface area, and/or volume of the object of interest.

In some embodiments, the method further includes: acquiring, by a user using an imaging system, the medical images of the subject, where the imaging system uses the one or more medical imaging modalities to generate the medical images; determining a size, surface area, and/or volume of the object of interest based on the estimated segmentation boundary around the object of interest; providing: (i) the portion of the second image with the estimated segmentation boundary around the object of interest, and/or (ii) the size, surface area, and/or volume of the object of interest; receiving, by the user, (i) the portion of the second image with the estimated segmentation boundary around the object of interest, and/or (ii) the size, surface area, and/or volume of the object of interest; and determining, by the user, a diagnosis of the subject based on (i) the portion of the second image with the estimated segmentation boundary around the object of interest, and/or (ii) a size, surface area, and/or volume of the object of interest.

In some embodiments, the method further includes administering, by the user, a treatment with a compound based on (i) the portion of the second image with the estimated segmentation boundary around the object of interest, (ii) a size, surface area, and/or volume of the object of interest, and/or (iii) the diagnosis of the subject.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures:

FIG. 6A: 3D U-Net. FIG. 6B: detecting the foreground with connected component preprocessing. FIG. 6C: EM segmentation. FIG. 6D: kidney detection via EM segmentation. FIG. 6E: kidney detection via EM segmentation on super-resolved images. The first row shows: ground truth manual labels overlaid on magnetic resonance imaging (MRI). The second row shows: transparent surface renderings of the ground truth and segmentation masks. Coronal and axial views are shown in pairs. The third row shows: Dice similarity coefficients (DSCs) shown as violin plots. Example datasets were selected based on the mean DSCs for each segmentation strategy. All segmentation results are 3D U-Net based except for C, which is only EM segmentation. The dashed box indicates the area for object detection. Scale bar=4 mm.

Figure 1:
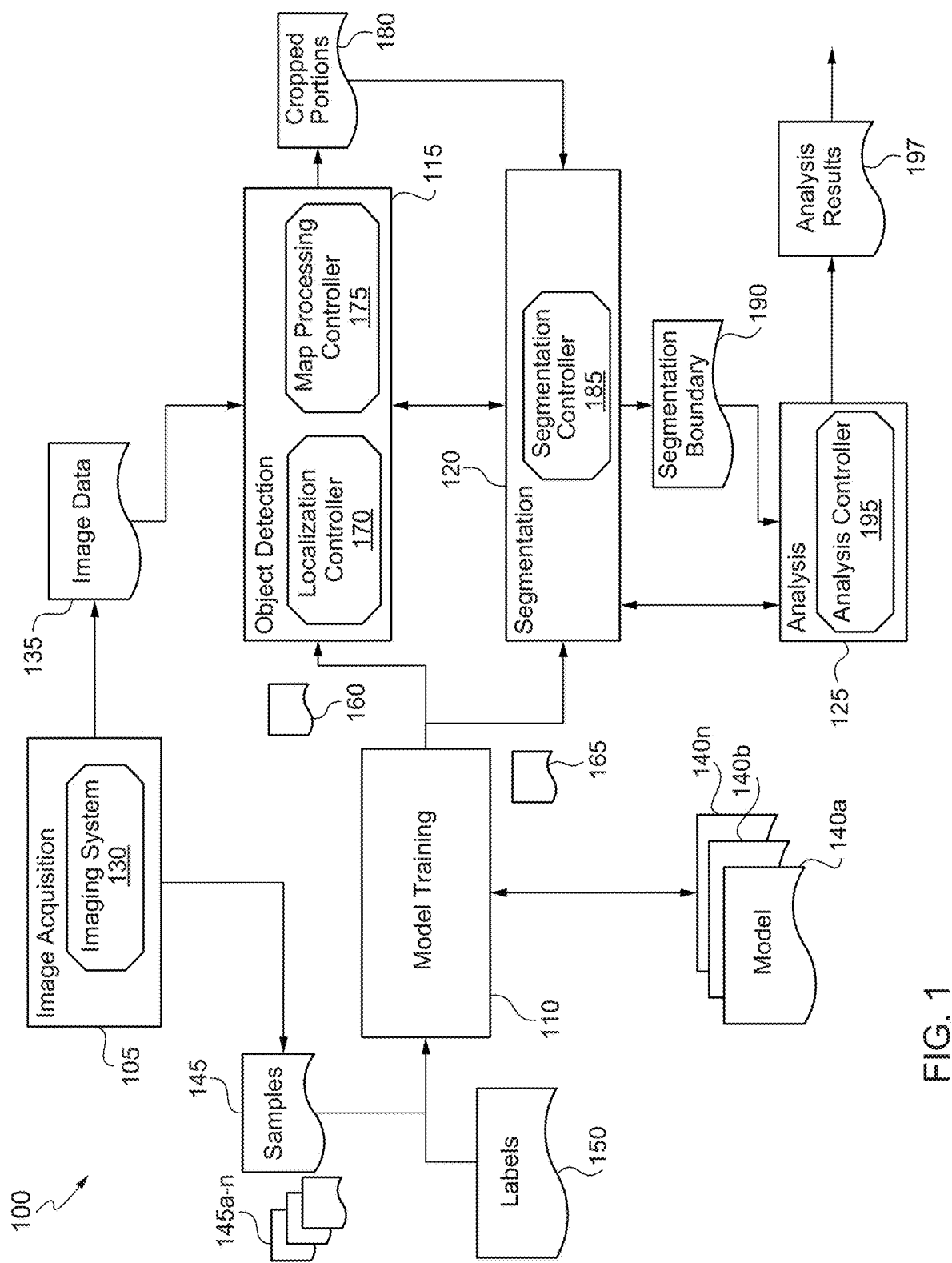
FIG. 1 shows an example computing environment for segmenting instances of an object of interest according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes techniques for automated object segmentation of medical images. More specifically, embodiments of the present disclosure provide techniques for segmenting objects within medical images using a deep learning network that is localized with object detection based on a derived contrast mechanism.

Medical image segmentation, identifying the pixels of objects (e.g., organs, lesions, or tumors) from background medical images such as computerized tomography (CT) or MRI images, is a fundamental task in medical image analysis for providing information about the shapes, sizes, and volumes of the objects. A change in organ size or volume can be a predominant feature of a disease process or a manifestation of pathology elsewhere in a subject. Additionally, tumor or lesion size or volume can be an important independent indicator in subjects with carcinoma (e.g., repeated size measurements during primary systemic therapy produce detailed information about response that could be used to select the most effective treatment regimen and to estimate the subject's prognosis). Various radiological and clinical techniques have been attempted in the past to estimate tumor or organ sizes and volumes, but most have been of limited utility due to unacceptable accuracy, poor reproducibility or difficulty in obtaining suitable images for size and volume measurements. More recently, several quantitative protocols have been developed and demonstrated promising results for measuring the size and volume of various organs, lesions, or tumors from various imaging modalities such as CT and MRI. Size and volumetric data for this purpose has been typically obtained using time-consuming manual segmentation methods. However, the promising ability of deep learning techniques has put these techniques as a primary option for image segmentation, and in particular for medical image segmentation, which greatly improves the practicality of obtaining size and volumetric data for quantitative protocols.

Although the use of deep learning techniques is beneficial in object segmentation, and achieves significant improvements compared with traditional manual and machine-learning based approaches, object segmentation is still challenging when it comes to low contrast and low resolution images, which are particularly prevalent in medical images such as MRI and CT images. The primary reasons for this challenge stems from: (i) the definition of the object such as an organ, lesion, or tumor being strongly impacted by the fuzzy visual identity and excessive noise of low contrast and low resolution images, which has mislead deep learning models to predict the true outline of the object, (ii) due to the repeated pooling operations in deep learning architectures, it is inevitable to lose object semantic and image structure information, which is severely missing in low contrast and low resolution images, thus the results of deep learning models typically suffer from inaccurate shape and poor localization of objects, (iii) since the pixels around the object boundaries are centered at similar receptive fields and the deep learning models only discriminate the binary labels of image pixels, it is difficult for a deep learning algorithm to learn the boundary knowledge, (iv) many medical images have a large filed-of-view or background preventing aliasing effects but when the background represents a significant portion of the image, the deep learning may not be optimally trained to segment the foreground object of interest ('background effect'), and (v) in the background, there can be similar appearing objects (e.g., sometimes a liver, heart, kidney can look like a tumor), the deep learning and simpler machine-learning algorithms may not be optimally trained to differentiate between these structures.

To address these limitations and problems, the techniques for automated object segmentation of the present embodiments use various imaging modalities and/or types of medical images with different characteristics (characteristics that make an object (or its representation in an image or display) distinguishable such as contrast or resolution) as a derived contrast mechanism to locate an object of interest, isolate the object of interest, and subsequently segment the object of interest using a deep learning model. For example, a first image of an object obtained by a first imaging modality may have a first characteristic (e.g., good contrast) that works well to provide a general outline of the object so that the first image may be used for object detection (providing a coarse grain boundary around the object and classification). However, this first image may be blurry or fuzzy enough that a deep learning network cannot determine for sure exactly where the edges of the object are for accurate object segmentation. In contrast, a second image of the object obtained using a second imaging modality or second image of a image feature/contrast mechanism of the same modality may have a second characteristic (e.g., high resolution) that works well to provide a well-defined boundary of the object so that the second image could be used for edge detection and fine grained object segmentation. Once the object is detected in the first image, the coarse grain boundary of the object is projected on the second image to localize the object within the second image. The coarse grain boundary of the object on the second image is then used to crop the second image prior to object segmentation. The localization and cropping of the second image alleviates the background effect and focuses the deep learning model on the edges of the object to learn the boundary knowledge for fine grained object segmentation.

One illustrative embodiment of the present disclosure is directed to a method that includes initially localizing (e.g., using an algorithm such as Expectation Maximization) an object of interest such as an organ, tumor, or lesion within a first medical image having a first characteristic, projecting a bounding box or segmentation mask of the object of interest onto a second medical image having a second characteristic to define a portion of the second medical image comprising the object of interest, and subsequently inputting the portion of the second medical image into a deep learning model such as convolutional neural network model, that is constructed as a detector using a weighted loss function capable of segmenting the portion of the second medical image and generating a segmentation boundary around the object of interest. The segmentation boundary may be used to calculate a volume of the object of interest for determining a diagnosis and/or a prognosis. In some instances, the calculated volume may further be associated with a time point. A volume of the object from the time point may be compared to a volume of the object from a previous time point in order to determine an efficacy of a treatment. The time point analysis provides context of organ or tumor change over time. Moreover, the specific contents within the object of interest defined by the segmentation boundary can have changes, e.g., more necrotic content or aggressive tumor type. In some instances, the segmentation boundary and a corresponding segmented area or volume may be used for quantifying an image metric such as image intensity. For example in PET there is standardized uptake value (SUV) or in MRI there is a diffusivity, T2, T1, etc. that correlate with certain image metrics such as image intensity, and thus quantification of the image metric could be used for determining values/metrics such as SUV specific to the object of interest. In other words the volume itself within the segmentation boundary is a useful measurement, and the values or measurements within the segmentation boundary and corresponding segmented area are also useful measurements.

Advantageously, these approaches utilize multiple medical images with varying characteristics and object detection techniques to detect the general area of an object of interest prior to attempting to segment the object of interest using a deep learning model. This reduces the background effect, decreases the complexity of the input data, and focuses the deep learning model on the edges of the object to learn the boundary knowledge for object segmentation. Additionally, because the complexity of the input data is decreased, the complexity of the deep learning model could be decreased (e.g., by reducing the number of kernels per convolutional layer). In some instances, the deep learning model is constructed with a weighted loss function, which minimizes segmentation error, improves training performance optimization, and further reduces the background effect that may still be apparent in some general areas determined by the object detection techniques.

II. Definitions

As used herein, when an action is "based on" something, this means the action is based at least in part on at least a part of the something.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

As used herein, a "mask" refers to an image that represents a surface area of a detected object. A mask may include pixels of nonzero intensity to indicate one or more regions of interest (e.g., one or more detected objects) and pixels of zero intensity to indicate background.

As used herein, a "binary mask" refers to a mask in which each pixel value is set to one of two values (e.g., 0 or 1). Zero intensity values can indicate that corresponding pixels are part of a background, and non-zero intensity values (e.g., values of 1) can indicate that corresponding pixels are part of a region of interest.

A used herein, "classification" refers to the process of taking an input (e.g., an image or a portion of an image) and outputting a class (e.g., "organ" or "tumor") or a probability that the input is a particular class. This may include binary classification (is a member of a class or not), multiclass classification (assigning to one or many classes), providing probabilities of membership in each class (e.g., there's a 90% probability that this input is an organ), and like classification schemas.

As used herein, "object localization" or "object detection" refers to the process of detecting instances of objects of a particular class in an image.

A used herein, a "bounding box" refers to a rectangular box that represents the general location of an object of a particular class in an image. The bounding box may be defined by the x and y axis coordinates in the upper-left and/or upper-right corner and the x and y axis coordinates in the lower-right and/or lower-left corner of the rectangle.

As used herein, a "segmentation boundary" refers to an estimated perimeter of an object within an image. A segmentation boundary may be generated during a segmentation process where features of the image are analyzed to determine locations of the edges of the object. The segmentation boundary may further be represented by a mask such as a binary mask.

As used herein, "segmentation" refers to determining a location and shape of an object within an image. Segmentation may involve determining a set of pixels that depict an area or perimeter of the object within the image. Segmentation may involve generating a mask such as a binary mask for an object. Segmentation may further involve processing multiple masks corresponding to the object in order to generate a 3D mask of the object.

III. Derived Contrast Mechanism

The goal of imaging procedures of the anatomy (e.g., organs or other human or mammalian tissue) and the physiological processes of a subject is generation of an image contrast with a good spatial resolution. Initial evolution of medical imaging focused on tissue (proton) density function and tissue relaxation properties for signal contrast generation, which are the main principles behind conventional MRI. MRI detects signals from protons of water molecules, however, it can only provide grayscale images in which each pixel contains one integer value. Unless two anatomical regions A and B contain water molecules with different physical or chemical properties, these two regions cannot be distinguished from each other with MRI. Otherwise, no matter how high the image resolution is, region A is indistinguishable from region B. To generate MR contrast based on the physical properties of water molecules, proton density (PD), T1 and T2 relaxation times, and the diffusion coefficient (D) are widely used. The PD represents water concentration. T1 and T2 are signal relaxation (decay) times after excitation, which are related to environmental factors, such as viscosity and the existence of nearby macromolecules. The diffusion term, D, represents the thermal (or Brownian) motion of water molecules.

After the initial focus on tissue (proton) density function and tissue relaxation properties researchers explored other methods to generate contrast exploiting other properties of water molecules. Diffusion imaging (DI) was a result of those research efforts. In DI, supplemental MR gradients are applied during the image acquisition. The motion of protons during the application of these gradients affects the signal in the image, thereby, providing information on molecular diffusion. DI may be performed using several techniques including diffusion-spectrum imaging (DSI) and diffusion-weighted imaging (DWI).

DWI is a non-invasive imaging method, with sensitivity to water diffusion within the architecture of the tissues that uses existing MRI technology in combination with specialized software and requires no additional hardware equipment, contrast agents, or chemical tracers. To measure diffusion using MRI, the supplemental MR gradients are employed to create an image that is sensitized to diffusion in a particular direction. In DWI, the intensity of each image element (voxel) reflects the best estimate of the rate of water diffusion in the particular direction. However, biological tissues are highly anisotropic, meaning that their diffusion rates are not the same in every direction. For routine DWI, the anisotropic nature of tissue is often ignored and the diffusion is reduced to a single average value, the apparent diffusion coefficient (ADC), but this is overly simplistic for many use cases. An alternative method is to model diffusion in complex materials using a diffusion tensor, a [3×3] array of numbers corresponding to diffusion rates in each combination of directions. The three diagonal elements (Dxx, Dyy, Dzz) represent diffusion coefficients measured along each of the principal (x-, y- and z-) laboratory axes. The six off-diagonal terms (Dxy, Dyz, etc) reflect the correlation of random motions between each pair of principal directions.

The introduction of the diffusion tensor model enables the indirect measurement of the degree of anisotropy and structural orientation that characterizes diffusion tensor imaging (DTI). The basic concept behind DTI is that water molecules diffuse differently along the tissues depending on its type, integrity, architecture, and presence of barriers, giving information about its orientation and quantitative anisotropy. With DTI analysis it is possible to infer, in each voxel, properties such as the molecular diffusion rate (Mean Diffusivity (MD) or Apparent Diffusion Coefficient (ADC)), the directional preference of diffusion (Fractional Anisotropy (FA)), the axial diffusivity (AD) (diffusion rate along the main axis of diffusion), and radial diffusivity (RD) (rate of diffusion in the transverse direction). DTI is usually displayed by either condensing the information contained in the tensor into one number (a scalar), or into 4 numbers (to give an R,G,B color and a brightness value, which is known as color fractional anisotropy). The diffusion tensor can also be viewed using glyphs, which are small three dimensional (3D) representations of the major eigenvector or whole tensor.

Similar to MRI and DTI, other modalities of medical imaging such as CT, X-ray, positron emission tomography (PET), photoacoustic tomography (PAT), sonography, combinations thereof such as PET-CT, PET-MR, and the like rely on various measurements, algorithms, and agents to generate image contrast and spatial resolution. For example, CT and X-ray use x-ray absorption to differentiate between air, soft tissue, and dense structures such as bone. Dense structures within the body stop x-rays and, thus, are easily imaged and visualized, whereas soft tissues vary in their ability to stop x-rays and, thus, may be faint or difficult to image and be visualized. One technique to increase image contrast in X-rays or CT scans is to utilize contrast agents that contain substances better at stopping x-rays making them more visible on an X-ray or CT image and, thus can be used to better visualize soft tissues such as blood vessels. PET uses small amounts of radioactive materials called radiotracers that can be detected and measured in a scan. The measurement differences between areas accumulating or labeled with the radiotracers versus non-accumulating or non-labeled areas is used to generate contrast to visualize structures and functions within the subject. PAT is a imaging modality based on the photoacoustic (PA) effect. A short-pulsed light source is typically used to irradiate the tissue, resulting in broadband PA waves. Following absorption of the light, an initial temperature rise induces a pressure rise, which propagates as a photoacoustic wave and is detected by an ultrasonic transducer to image optical absorption contrast. Ultrasound is a non-invasive diagnostic technique used to image inside the body. A transducer sends out a beam of sound waves into the body. The sound waves are reflected back to the transducer by boundaries between tissues in the path of the beam (e.g. the boundary between fluid and soft tissue or tissue and bone). When these echoes hit the transducer, the echoes generate electrical signals that are sent to the ultrasound scanner. Using the speed of sound and the time of each echo's return, the scanner calculates the distance from the transducer to the tissue boundary. These distances are then used to generate contrast to visualize tissues and organs.

All of these imaging modalities generate image contrast with spatial resolution adequate enough to visualize representations of the interior of a body for clinical analysis, medical intervention, and/or medical diagnosis, as well as visual representation of the function of some organs or tissues. However, as discussed herein, the image contrast and spatial resolution provided by each of these imaging modalities individually is not sufficient for accurate object segmentation, especially object segmentation used for obtaining size and volumetric data, that is performed by deep learning networks. To overcome this limitation and others, the techniques described herein use a combination of imaging modalities, types of images, and/or varying characteristics to locate an object of interest, isolate the object of interest, and subsequently segment the object of interest using a deep learning model. Specifically, it has been discovered that some imaging modalities, types of images, and/or characteristics perform better with object detection as compared to object segmentation; whereas other imaging modalities, types of images, and/or characteristics perform better with object segmentation. By identifying which imaging modalities, type of images, and/or characteristics are better suited for which computer vision task (e.g., object detection or object segmentation), it is possible to leverage these difference as a derived contrast mechanism.

The characteristics of images that can be leveraged by the derived contrast mechanism include brightness, contrast, and spatial resolution. Brightness (or luminous brightness) is a measure of relative intensity values across the pixel array after an image has been acquired with a digital camera or digitized by an analog-to-digital converter. The higher the relative intensity value the brighter the pixels and generally the whiter an image will appear; whereas the lower the relative intensity value the darker the pixels and generally the blacker an image will appear. Contrast refers to differentiation that exists between various image features in both analog and digital images. The differentiation within the image can be in the form of different shades of gray, light intensities, or colors. Images having a higher contrast level generally display a greater degree of grayscale, color, or intensity variation than those of lower contrast. Spatial resolution refers to the number of pixels utilized in construction of a digital image. Images having higher spatial resolution are composed with a greater number of pixels than those of lower spatial resolution.

The derived contrast mechanism comprises: (i) a first imaging modality capable of obtaining images with characteristics (e.g., DTI-FA) that are used for detecting an object of interest, and (ii) a second imaging modality capable of obtaining images with characteristics (e.g., DTI-MD) that are used for segmenting the object of interest. Various imaging modalities, types of images, and/or characteristics may be combined to improve upon each computer vision task (e.g., object detection or object segmentation). In various embodiments, the imaging modalities of the derived contrast mechanism are the same such as MRI or DTI. In some embodiments, an imaging modality is used to obtain a first image having a first characteristic and a second image having a second characteristic, where the first image is different from the second image. For example, MRI may be used to obtain diffusion tensor parametric maps for a subject. The diffusion tensor parametric maps may include a first measurement map such as FA map and a second measurement map such as a MD map. In some embodiments, an imaging modality is used to obtain an first image having a first characteristic and a second image having a second characteristic, where the first characteristic is different from the second characteristic. For example, CT may be used to obtain multiple CT scans for a subject. The CT scan may include a first CT scan such as a low resolution CT scan and a second CT scan such as a high resolution CT (HRCT) scan. Alternatively, MRI may be used to obtain diffusion tensor parametric maps for a subject. The diffusion tensor parametric maps may include a first MD map such as low resolution MD map and a second MD map such as a high resolution MD map. In other embodiments, the imaging modalities of the derived contrast mechanism are different such as PAT and ultrasound. The PAT may be used to obtain an first type of image having a first characteristic and the ultrasound may be used to obtain a second type of image having a second characteristic, where the first type of image and the first characteristic are different from the second type of image and the second characteristic.

Specific examples of derived contrast mechanisms using different types of imaging modalities, types of images, and characteristics include the following:

(A) MRI

Kidney Segmentation: (i) FA measurement map for object detection (contrast generated by fractional anisotropy); and (ii) MD measurement map (contrast generated by mean diffusivity) or T2-weighted anatomical image (contrast generated from signal relaxation times after excitation) for object segmentation.

Multiple Sclerosis Brain Lesion Segmentation: (i) single echo T2 image for object detection (contrast generated from single-shot echo-planar imaging of signal relaxation times after excitation); and (ii) echo enhanced or T2-weighted anatomical image (contrast generated from a low flip angle, long echo time, and long repetition time used to accentuate the signal relaxation times after excitation) for object segmentation.

Liver Segmentation: (i) MD measurement map (contrast generated by mean diffusivity) for object detection, and (ii) high resolution MD measurement map (high resolution and contrast generated by mean diffusivity), T2-weighted anatomical image (contrast generated from signal relaxation times after excitation) or PD (contrast generated from water concentration) for object segmentation.

(B) CT

Lung and Liver Tumor Segmentation: (i) CT scan (low resolution) for object detection of the lung or liver, and (ii) CT scan (HRCT) for object segmentation of the tumor(s).

Trabecular Bone: (i) CT scan (low resolution) for object detection of the trabecular space (non-cortical bone), and (ii) CT scan (HRCT) for object segmentation of the trabeculae.

(C) PET

Tumor or Organ Detection: (i) PET high contrast/low resolution (contrast generated by radiotracer measurements) for object detection, and (ii) PET-CT or PET-MR high contrast/high resolution (contrast generated by radiotracer measurements) for object segmentation.

(D) Photoacoustic Tomography (Optical Ultrasound Technology)

Tumor or Organ Detection: (i) PAT (contrast generated by optical absorption) for object detection, and (ii) Ultrasound (contrast generated from echo return distance between the transducer and the tissue boundary) for object segmentation.

It should be understood that the examples and embodiments regarding MRI, CT, PAT, PET, and the like are described herein for illustrative purposes only and alternative imaging modalities (e.g., fluoroscopy, magnetic resonance angiography (MRA), and mammography) will be suggested to persons skilled in the art for implementing various derived contrast mechanisms in accordance with aspects of the present disclosure. Moreover, the parameters of any of these imaging modalities can be modified (e.g., different tracers, angle configurations, wave lengths, etc.) to capture different structures or regions of the body, and one or more of these types of modified imaging techniques may be combined with one or more other imaging techniques for implementing various derived contrast mechanisms in accordance with aspects of the present disclosure.

IV. Techniques for Segmenting Medical Images

The segmenting of MRI images is split into two parts. A first part of the segmenting pertains to a first vision model constructed to perform localization (object detection) of classes within a first image (e.g., a diffusion tensor parametric map or a CT image). These classes are "semantically interpretable" and correspond to real-world categories such as the liver, the kidney, the heart, and the like. The localization is executed using EM, you only look once (YOLO) or (YOLOv2) or (YOLOv3), or similar object detection algorithms, which is initialized with a standard clustering technique (e.g., k-means clustering technique, Otsu's method, Density-Based Spatial Clustering of Applications with Noise (DBSCAN) technique, mini-batch K-means technique, or the like) heuristically. The initialization is used to provide the initial estimate of the parameters of the likelihood model for each class. Expectation maximization is an iterative process to find (local) maximum likelihood or maximum a posteriori (MAP) estimates of parameters in one or more statistical models. The EM iteration alternates between performing an expectation (E) step, which creates a function for the expectation of the log-likelihood evaluated using the current estimate for the parameters, and a maximization (M) step, which computes parameters maximizing the expected log-likelihood found on the E step. These parameter-estimates are then used to determine the distribution of the latent variables in the next E step. The result of the localization is boundary boxes or segmentation masks around each object with a probability for each class. The general location of an object of interest (e.g., the kidney) is isolated using one or more of the classes associated with the object of interest.

To alleviate the background effect of medical images, the boundary box or segmentation mask for the object of interest is projected in a slice direction (axial, coronal, and sagittal) onto a second image (e.g., a diffusion tensor parametric map or a CT image). In instances of localization being used to determine a segmentation mask, the boundaries of the projected segmentation mask are used to define a bounding box in the second image around the general location of the object of interest (e.g., the kidney) (a rectangular box drawn completely around a pixel wise mask associated with the object of interest). In some instances, the bounding box (determined via localization or defined based on boundaries of the projected segmentation mask) is enlarged by a predetermined number of pixels on all sides to ensure coverage of the object of interest. The area within the bounding box is then cropped from the second image to obtain apportion of the second image having the object of interest, and the portion of the second images is used as input into a second vision model to segment the object of interest. The second part of the of the segmenting pertains to a second vision model (a deep learning neural network) constructed with a weighted loss function (e.g., a Dice loss) to overcome the unbalanced nature between the object of interest and the background, and thus focus training on evaluating segmenting the object of interest. Moreover, the second vision model may be trained using an augmented data set such that the deep learning neural network is capable of being trained on a limited set of medical images. The trained second vision model takes as input the cropped portion of the second image and outputs the portion of the second image with an estimated segmentation boundary around the object of interest. The estimated segmentation boundary may be used to calculate a volume, surface area, axial dimensions, largest axial dimension, or other size-related metrics of the object of interest. Any one or more of these metrics may, in turn, be used alone or in conjunction with other factors to determine a diagnosis and/or a prognosis of a subject.

IV.A. Example Computing Environment

FIG. 1 illustrates an example computing environment 100 (i.e., a data processing system) for segmenting instances of an object of interest within images using a multi-stage segmentation network according to various embodiments. As shown in FIG. 1, the segmenting performed by the computing environment 100 in this example includes several stages: an image acquisition stage 105, a model training stage 110, an object detection stage 115, a segmentation stage 120, and an analysis stage 125.

The image acquisition stage 110 includes one or more imaging systems 130 (e.g., an MRI imaging system) for obtaining images 135 (e.g., MR images) of various parts of a subject. The imaging systems 130 are configured to use one or more radiological imaging techniques such as x-ray radiography, fluoroscopy, MRI, ultrasound, nuclear medicine functional imaging (e.g., PET), thermography, CT, mammography and the like to obtain the images 135. The imaging systems 130 are able to determine the difference between various structures and functions within the subject based on characteristics (e.g., brightness, contrast, and spatial resolution) associated with each of the imaging systems 130 and generate a series of two-dimensional images. Once the series of two-dimensional images are collected by the scanner's computer, the two-dimensional images can be digitally "stacked" together by computer analysis to reconstruct a three-dimensional image of the subject or a portion of the subject. The two-dimensional images and/or the reconstructed three-dimensional images 135 allow for easier identification and location of basic structures (e.g., organs) as well as possible tumors or abnormalities. Each two-dimensional image and/or the reconstructed three-dimensional image 135 may correspond to a session time and a subject and depict an interior region of the subject. Each two-dimensional image and/or the reconstructed three-dimensional image 135 may further be of a standardized size, resolution, and/or magnification.

In some embodiments, the one or more imaging systems 130 include a DI system (e.g., an MRI system with special software) configured to apply supplemental MR gradients during the image acquisition. The motion of protons during the application of these gradients affects the signal in the images, thereby, providing information on molecular diffusion. A DTI matrix is obtained from a series of diffusion-weighted images in various gradient directions. The three diffusivity parameters or eigenvalues ($\lambda 1$, $\lambda 2$, and $\lambda 3$), are generated by matrix diagonalization. The diffusivities are scalar indices describing water diffusion in a specific voxels (the smallest volumetric elements in the image) associated with the geometry of tissue. Various diffusion imaging techniques may be used to compute diffusion tensor parametric maps and additional image contrasts from the diffusivities. DTI properties or indices represented by these maps may include (but are not limited to) molecular diffusion rate (MD map or ADC map), the directional preference of diffusion (FA map), the AD map (diffusion rate along the main axis of diffusion), and RD map (rate of diffusion in the transverse direction). The diffusivities ($\lambda 1$, $\lambda 2$, and $\lambda 3$) obtained by DTI matrix diagonalization can be delimitated into parallel ($\lambda 1$) and perpendicular ($\lambda 2$ and $\lambda 3$) components to the tissue. The sum of the diffusivities ($\lambda 1$, $\lambda 2$, and $\lambda 3$) is called the trace, while their average (=trace/3) is called the MD or ADC. Fractional anisotropy (FA) is an index for the amount of diffusion asymmetry within a voxel, defined in terms of its diffusivities ($\lambda 1$, $\lambda 2$, and $\lambda 3$). The value of FA varies between 0 and 1. For perfect isotropic diffusion, $\lambda 1 = \lambda 2 = \lambda 3$, the diffusion ellipsoid is a sphere, and FA=0. With progressive diffusion anisotropy, the eigenvalues become more unequal, the ellipsoid becomes more elongated, and the FA→1. Axial diffusivity (AD), $\lambda_\| \equiv \lambda 1 > \lambda 2, \lambda 3$, describes the mean diffusion coefficient of water molecules diffusing parallel to a tract within the voxel of interest. Similarly, radial diffusivity (RD), $\lambda^{\perp} \equiv (\lambda 2 + \lambda 3)/2$, can be defined as the magnitude of water diffusion perpendicular to the main eigenvector.

The images 135 depict one or more objects of interest. The objects of interest can be any 'thing' of interest within the subject such as a region (e.g., an abdominal region), an organ (e.g., the kidney), a lesion/tumor (e.g., a malignant liver tumor or a brain lesion), a metabolic function (e.g., synthesis of plasma protein in the liver), and the like. In some instances, multiple images 135 depict an object of interest, such that each of the multiple images 135 may correspond to a virtual "slice" of the object of interest. Each of the multiple images 135 may have a same viewing angle, such that each image 135 depicts a plane that it parallel to other planes depicted in other images 135 corresponding to the subject and object of interest. Each of the multiple images 135 may further correspond to a different distance along a perpendicular axis to the plane. In some instances, the multiple images 135 depicting the object of interest undergo a pre-processing step to align each image and generate a three-dimensional image structure for the object of interest.

In some embodiments, the images 135 comprise diffusion tensor parametric maps depicting one or more objects of interest of the subject. In certain instances, at least two diffusion tensor parametric maps (e.g., a first diffusion tensor parametric map and a second diffusion tensor parametric map) are generated for the object of interest. A diffusion tensor parametric map may be generated by a DTI system and describe a rate and/or direction of diffusion of water molecules in order to provide further context for the object of interest. More than one diffusion tensor parametric map may be generated, such that each diffusion tensor parametric map corresponds to a different direction. For example, diffusion tensor parametric maps may include an image depicting a FA, an image depicting a MD, an image depicting an AD, and/or an image depicting a RD. Each of the diffusion tensor parametric maps may additionally have a viewing angle depicting a same plane and a same distance along a perpendicular axis of the plane as a corresponding MR image, such that each MR image depicting a virtual "slice" of an object of interest has a corresponding diffusion tensor image depicting a same virtual "slice" of the object of interest.

The model training stage 110 builds and trains one or more models 140a-140n ('n' represents any natural number) (which may be referred to herein individually as a model 140 or collectively as the models 140) to be used by the other stages. The model 140 can be a machine-learning ("ML") model, such as a convolutional neural network ("CNN"), e.g. an inception neural network, a residual neural network ("Resnet"), a U-Net, a V-Net, a single shot multibox detector ("SSD") network, or a recurrent neural network ("RNN"), e.g., long short-term memory ("LSTM") models or gated recurrent units ("GRUs") models, or any combination thereof. The model 140 can also be any other suitable ML model trained in object detection and/or segmentation from images, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). The computing environment 100 may employ the same type of model or different types of models for segmenting instances of an object of interest. In certain instances, model 140 is constructed with weighted loss function, which compensates for the imbalanced nature within each image between the large field-of-view or background and the small foreground object of interest, as described in further detail herein.

To train a model 140 in this example, samples 145 are generated by acquiring digital images, splitting the images into a subset of images 145a for training (e.g., 90%) and a subset of images 145b for validation (e.g., 10%), preprocessing the subset of images 145a and the subset of images 145b, augmenting the subset of images 145a, and in some instances annotating the subset of images 145a with labels 150. The subset of images 145a are acquired from one or more imaging modalities (e.g., MRI and CT). In some instances, the subset of images 145a are acquired from a data storage structure such as a database, an image system (e.g., one or more imaging systems 130), or the like associated with the one or more imaging modalities. Each image depicts one or more objects of interest such as a cephalic region, a chest region, an abdominal region, a pelvic region, a spleen, a liver, a kidney, a brain, a tumor, a lesion, or the like.

The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The preprocessing may comprise cropping the images such that each image only contains a single object of interest. In some instances, the preprocessing may further comprise standardization or normalization to put all features on a same scale (e.g., a same size scale or a same color scale or color saturation scale). In certain instances, the images are resized with a minimum size (width or height) of predetermined pixels (e.g., 2500 pixels) or with a maximum size (width or height) of predetermined pixels (e.g., 3000 pixels) and kept with the original aspect ratio.

Augmentation can be used to artificially expand the size of the subset of images 145a by creating modified versions of images in the datasets. Image data augmentation may be performed by creating transformed versions of images in the datasets that belong to the same class as the original image. Transforms include a range of operations from the field of image manipulation, such as shifts, flips, zooms, and the like. In some instances, the operations include random erasing, shifting, brightness, rotation, Gaussian blurring, and/or elastic transformation to ensure that the model 140 is able to perform under circumstances outside those available from the subset of images 145a.

Augmentation can additionally or alternatively be used to artificially expand a number of images in the datasets that the model 140 can take as input during training. In some instances, at least a portion of a training data set (i.e., the subset of images 145a) can include a first set of images corresponding to a region of one or more subjects and a second set of images corresponding to a different region of the same or different subjects. For example, if at least a first subset of the images corresponding to an abdominal region are used to detect one or more objects of interest within the abdominal region, a second subset of images corresponding to a cephalic region may also be included within the training data set. In such instances, the first set of images corresponding to a region of one or more subjects are histogram matched to the second set of images corresponding to a different region of the same or different subjects within the training data set. In terms of the previous example, histograms of images corresponding to a cephalic region may be processed as the reference histogram, and then histograms of images corresponding to an abdominal region are matched with the reference histograms. Histogram matching can be based upon pixel intensity, pixel color, and/or pixel luminance, such that processing of a histogram entails matching the pixel intensity, pixel color, and/or pixel luminance of the histogram to the pixel intensity, pixel color, and/or pixel luminance of a reference histogram.

Annotation can be performed manually by one or more humans (annotators such as a radiologists or pathologists) confirming the presence of one or more objects of interest in each image of the subset of images 145a and providing labels 150 to the one or more objects of interest, for example, drawing a bounding box (a ground truth) or segmentation boundary, using annotation software, around the area confirmed by the human to include the one or more objects of interest. In certain instances, the bounding box or segmentation boundary may only be drawn for instances that have a greater than 50% in probability of being the object of interest. For the images, which are annotated by multiple annotators, the bounding boxes or segmentation boundaries from all annotators may be used. In some instances, annotation data may further indicate a type of an object of interest. For example, if an object of interest is a tumor or lesion, then annotation data may indicate a type of tumor or lesion, such as a tumor or lesion in a liver, a lung, a pancreas, and/or a kidney.

In some instances, a subset of images 145 may be transmitted to an annotator device 155 to be included within a training data set (i.e., the subset of images 145a). Input may be provided (e.g., by a radiologist) to the annotator device 155 using (for example) a mouse, track pad, stylus and/or keyboard that indicates (for example) whether the image depicts an object of interest (e.g., a lesion, an organ, etc.); a number of objects of interest depicted within the image; and a perimeter (bounding box or segmentation boundary) of each depicted object of interest within the image. Annotator device 155 may be configured to use the provided input to generate labels 150 for each image. For example, the labels 150 may include a number of objects of interest depicted within an image; a type classification for each depicted objects of interest; a number of each depicted object of interest of a particular type; and a perimeter and/or mask of one or more identified objects of interest within an image. In some instances, labels 150 may further include a perimeter and/or mask of one or more identified objects of interest overlaid onto a first type of image and a second type of image.

The training process for model 140 includes selecting hyperparameters for the model 140 and performing iterative operations of inputting images from the subset of images 145a into the model 140 to find a set of model parameters (e.g., weights and/or biases) that minimizes a loss or error function for the model 140. The hyperparameters are settings that can be tuned or optimized to control the behavior of the model 140. Most models explicitly define hyperparameters that control different aspects of the models such as memory or cost of execution. However, additional hyperparameters may be defined to adapt a model to a specific scenario. For example, the hyperparameters may include the number of hidden units of a model, the learning rate of a model, the convolution kernel width, or the number of kernels for a model. In some instances, the number of model parameters are reduced per convolutional and deconvolutional layer and/or the number of kernels are reduced per convolutional and deconvolutional layer by one half as compared to typical CNNs, as described in detail herein. Each iteration of training can involve finding a set of model parameters for the model 140 (configured with a defined set of hyperparameters) so that the value of the loss or error function using the set of model parameters is smaller than the value of the loss or error function using a different set of model parameters in a previous iteration. The loss or error function can be constructed to measure the difference between the outputs inferred using the models 140 (in some instances, the segmentation boundary around one or more instances of an object of interest is measured with a Dice similarity coefficient) and the ground truth segmentation boundary annotated to the images using the labels 150.

Once the set of model parameters are identified, the model 140 has been trained and can be validated using the subset of images 145b (testing or validation data set). The validation process includes iterative operations of inputting images from the subset of images 145b into the model 140 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of images from the subset of images 145b are input into the model 145 to obtain output (in this example, the segmentation boundary around one or more objects of interest), and the output is evaluated versus ground truth segmentation boundaries using correlation techniques such as Bland-Altman method and the Spearman's rank correlation coefficients and calculating performance metrics such as the error, accuracy, precision, recall, receiver operating characteristic curve (ROC), etc.

As should be understood, other training/validation mechanisms are contemplated and may be implemented within the computing environment 100. For example, the model may be trained and hyperparameters may be tuned on images from the subset of images 145a and the images from the subset of images 145b may only be used for testing and evaluating performance of the model. Moreover, although the training mechanisms described herein focus on training a new model 140. These training mechanisms can also be utilized to fine tune existing models 140 trained from other datasets. For example, in some instances, a model 140 might have been pre-trained using images of other objects or biological structures or from sections from other subjects or studies (e.g., human trials or murine experiments). In those cases, the models 140 can be used for transfer learning and retrained/validated using the images 135.

The model training stage 110 outputs trained models including one or more trained object detection models 160 and one or more trained segmentation models 165. A first image 135 is obtained by a localization controller 170 within the object detection stage 115. The first image 135 depicts an object of interest. In some instances, the first image is a diffusion tensor parametric map having a first characteristic such as FA or MD contrast. In other instances, the first image is an MR image having a first characteristic such as a single echo T2 contrast or a T2-weighted anatomical contrast. In other instances, the first image 135 is a CT image having a first characteristic such as a low resolution or a high resolution. In other instances, the first image 135 is a CT image having a first characteristic such as agent contrast. In other instances, the first image 135 is a PET image having a first characteristic such as radiotracer contrast or low resolution. In other instances, the first image 135 is a PET-CT image having a first characteristic such as radiotracer contrast or high resolution. In other instances, the first image 135 is a PET-MR image having a first characteristic such as radiotracer contrast or high resolution. In other instances, the first image 135 is a PAT image having a first characteristic such as optical absorption contrast. In other instances, the first image 135 is a ultrasound image having a first characteristic such as echo or transducer to the tissue boundary distance.

The localization controller 170 includes processes for localizing, using the one or more object detection models 160, an object of interest within the image 135. The localizing includes: (i) locating and classifying, using object detection models 160, objects within the first image having the first characteristic into a plurality of object classes, where the classifying assigns sets of pixels or voxels of the first image into one or more of the plurality of object classes; and (ii) determining, using the object detection models 160, a bounding box or segmentation mask for the object of interest within the first image based on sets of pixels or voxels assigned with an object class of the plurality of object classes. The object detection models 160 utilize one or more object detection algorithms in order to extract statistical features used to locate and label objects within the first image and predict a bounding box or segmentations mask for the object of interest.

In some instances, the localizing is executed using EM, YOLO, YOLOv2, YOLOv3, or similar object detection algorithms, which is initialized with a standard clustering technique (e.g., K-means or Otsu's method) heuristically. The initialization is used to provide the initial estimate of the parameters of the likelihood model for each class. For example in the instance of using EM with a K-means clustering technique, given a fixed number of k clusters, observations are assigned to the k clusters so that the means across clusters (for all variables) are as different from each other as possible. The EM clustering technique then computes posterior probabilities of cluster memberships and cluster boundaries based on one or more prior probability distributions parametrized with the initial estimate of the parameters for each cluster (class). The goal of the EM clustering technique then is to maximize the overall probability or likelihood of the data, given the (final) clusters. The results of the EM clustering technique are different from those computed by K-means clustering technique. The K-means clustering technique will assign observations (pixels or voxels such as pixel or voxel intensities) to clusters to maximize the distances between clusters. The EM clustering technique does not compute actual assignments of observations to clusters, but classification probabilities. In other words, each observation belongs to each cluster with a certain probability. Thereafter, observations may be assigned, by the localization controller 170, to clusters based on the (largest) classification probability. The result of the localization is bounding boxes or segmentation masks with a probability for each class. The general location of an object of interest (e.g., the kidney) is isolated based on sets of pixels or voxels assigned with an object class associated with the object of interest.

The bounding box or segmentation mask for the object of interest are availed to a map processing controller 175 within the object detection stage 115. A second image 135 is obtained by a map processing controller 175 within the object detection stage 115. The second image 135 depicts the same object of interest depicted in the first image 135. In some instances, the second image is a diffusion tensor parametric map having a second characteristic such as FA or MD contrast. In other instances, the second image is an MR image having a second characteristic such as a single echo T2 contrast or a T2-weighted anatomical contrast. In other instances, the second image 135 is a CT image having a second characteristic such as a low resolution or a high resolution. In other instances, the second image 135 is a CT image having a second characteristic such as agent contrast. In other instances, the second image 135 is a PET image having a second characteristic such as radiotracer contrast or low resolution. In other instances, the second image 135 is a PET-CT image having a second characteristic such as radiotracer contrast or high resolution. In other instances, the second image 135 is a PET-MR image having a second characteristic such as radiotracer contrast or high resolution. In other instances, the second image 135 is a PAT image having a second characteristic such as optical absorption contrast. In other instances, the second image 135 is a ultrasound image having a second characteristic such as echo or transducer to the tissue boundary distance.

Map processing controller 170 includes processes for overlaying the bounding box or segmentation mask corresponding to the detected object of interest from the first image onto the same of object of interest as depicted in the second image. In instances in which the segmentation mask is determined, the segmentation mask is projected onto the second image (e.g., two-dimensional slices of the second image) such that the boundaries of the segmentation mask can be used to define a rectangular bounding box enclosing a region of interest corresponding to the object of interest within the second image. In some instances, the bounding box includes additional padding (e.g., padding of 5 pixels, 10 pixels, 15 pixels, etc.) to each edge of a perimeter of the segmentation mask in order to ensure an entirety of the region of interest is enclosed. Map processing controller 175 further includes processes configured to crop the second image such that only a cropped portion 180 corresponding to the bounding box is depicted. In instances where more than one bounding box is defined (e.g., for cases in which multiple objects of interest are detected within the image), a cropped portion of the second image is generated for each bounding box. In some instances, each cropped portion is further be resized (e.g., with additional padding) in order to maintain a uniform size.

The cropped portion(s) 180 of the second image is transmitted to a segmentation controller 185 within the segmentation stage 120. The segmentation controller 185 includes processes for segmenting, using the one or more segmentation models 165, the object of interest within the cropped portion(s) 180 of the second image. The segmenting includes generating, using the one or more segmentation models 165, an estimated segmentation boundary around the object of interest; and outputting, using the one or more segmentation models 165, the cropped portion(s) of the second image with the estimated segmentation boundary 190 around the object of interest. Segmentation may include assessing variations in pixel or voxel intensities for each cropped portion to identify a set of edges and/or contours corresponding to an object of interest. Upon identifying the set of edges and/or contours, the one or more segmentation models 165 generate an estimated segmentation boundary 190 for the object of interest. In some embodiments, the estimated segmentation boundary 190 corresponds to a three-dimensional representation of the object of interest. In some instances, the segmenting further includes determining a probability score of the object of interest being present in the estimated segmentation boundary 190, and outputting the probability score with the estimated segmentation boundary 190.

The cropped portion(s) of the second image with the estimated segmentation boundary 190 around the object of interest (and optional probability score) may be transmitted to an analysis controller 195 within the analysis stage 125. The analysis controller 195 includes processes for obtaining or receiving the cropped portion(s) of the second image with the estimated segmentation boundary 190 around the object of interest (and optional probability score) and determining analysis results 197 based on the estimated segmentation boundary 190 around the object of interest (and optional probability score). The analysis controller 195 may further includes processes for determining a size, axial dimensions, a surface area, and/or a volume of the object of interest based on the estimated segmentation boundary 190 around the object of interest. In some instances, the estimated segmentation boundary 190 or derivations thereof (e.g., size, axial dimensions, volume of the object of interest, etc.) for the object of interest is further used to determine a diagnosis and/or a prognosis for a subject. In further instances, the estimated segmentation boundary 190 for the object of interest is compared to an estimated segmentation boundary 190 for the same object of interest imaged at a previous time point in order to determine a treatment efficacy for a subject. For example, if a target object is a lesion, estimated segmentation boundaries 190 of lesions for a subject may provide information regarding a type of cancer (e.g., a location of lesion), a metastasis progression (e.g., if a number of lesions increase and/or if a number of locations of lesion(s) increase for the subject), and a drug efficacy (e.g., whether a number, size, and/or volume of lesion(s) increase or decrease.

While not explicitly shown, it will be appreciated that the computing environment 100 may further include a developer device associated with a developer. Communications from a developer device to components of the computing environment 100 may indicate what types of input images are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

IV.B. Exemplary Data Augmentation for Model Training

The second part of the segmenting pertains to a second vision model (e.g., a deep learning neural network) constructed with a weighted loss function (e.g., a Dice loss). The deep learning neural network is trained on images of one or more objects of interest from subjects. The images are generated from one or more medical imaging modalities. However, data sets of images generated from some medical imaging modalities can be sparse. In order to address the sparsity of these images, the images of the training data are augmented to artificially increase the number and variety of images within the data sets. More specifically, the augmentation may be performed by performing histogram matching to simulate other contrasts within other regions of a same or different subject (e.g., regions of a subject where the object of interest may not be found) and increase variance of the training dataset.

Figure 2:
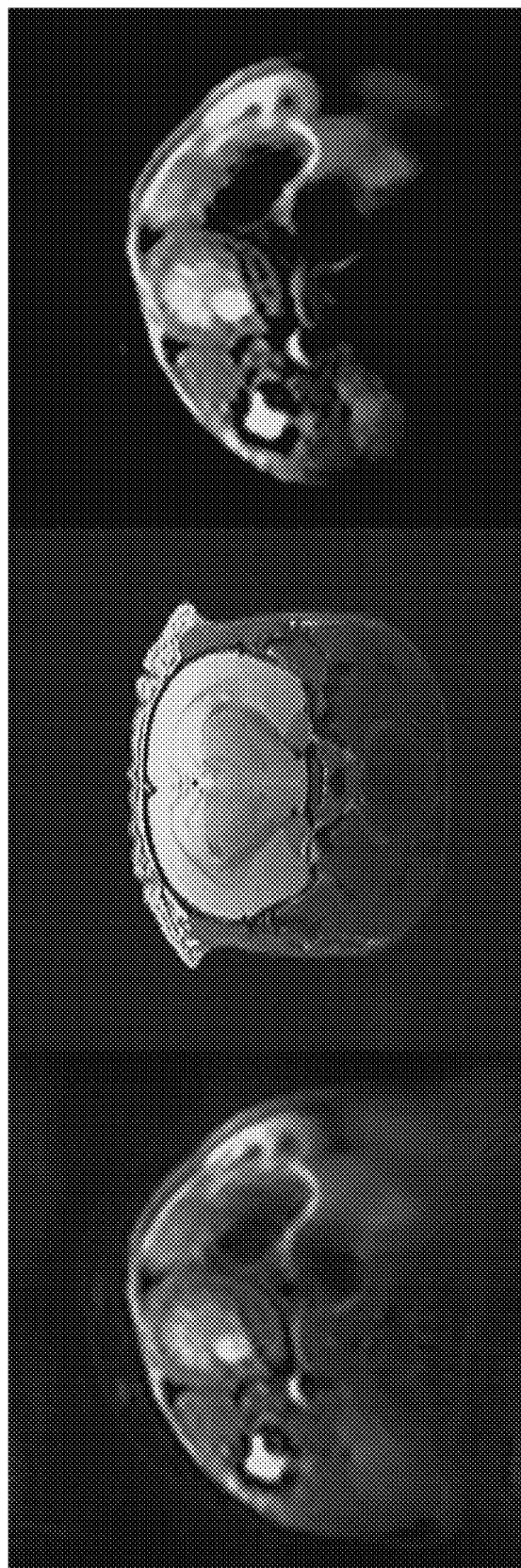
FIG. 2 shows histogram matching used to simulate other contrasts and increase variance of the training dataset according to various embodiments.

As an example, each image of a training set or subset of images from a training set may be histogram matched with one or more reference images to generate a new set of images to artificially increase the training dataset size in a so called data augmentation process which reduces overfitting. As shown in FIG. 2, each image of the training set (left image) may be histogram matched with a reference image (center image) to generate new set of images (right image). Thus, the original training set or subset of images is essentially increased in number and variety by a factor of 2 by the histogram matching. Histogram matching is the transformation of the original image so that its histogram matches a reference histogram. Histogram matching is performed by first equalizing both original and reference histogram using histogram equalization (e.g., stretches the histogram to fill the dynamic range and at the same time tries to keep the histogram uniform), and then mapping from the original to the reference histogram based on the equalized image and a transformation function. For example, suppose a pixel intensity value 20 in the original image gets mapped to 35 in the equalized image and suppose a pixel intensity value 55 in the reference image gets mapped to 35 in the equalized image, then it is determinable that a pixel intensity value 20 in the original image should be mapped to a pixel intensity value 55 in the reference image. The mapping from original to equalized to the reference image may then be used to transform the original image into the new image. In some instances, one or both data sets (i.e., the original set of images and the new set of images) can be further augmented using standard techniques such as rotation and flipping (e.g., rotate each image 90°, flipped left-to-right, flipped up-to-down, and the like) to further increase the number and variety images available for training.

The benefit of using histogram matching based data augmentation is: (i) the technique takes advantage of another dataset from the same species/instrument/image intensity etc.; (ii) the mask (label) corresponding to the histogram matched images are exactly the same as the original images in the training set; (iii) the number of images in the training set is multiplied by the number of images that are uses as the reference; and (iv) the variance in the training set increases and as such the structure of the images of the training set is preserved; whereas the intensity of the pixels are changing which makes the segmentation framework independent from the pixel intensity and dependent on the image and the structure of the object of interest.

IV.C. Exemplary Three-Dimensional Deep Neural Network

Figure 3:
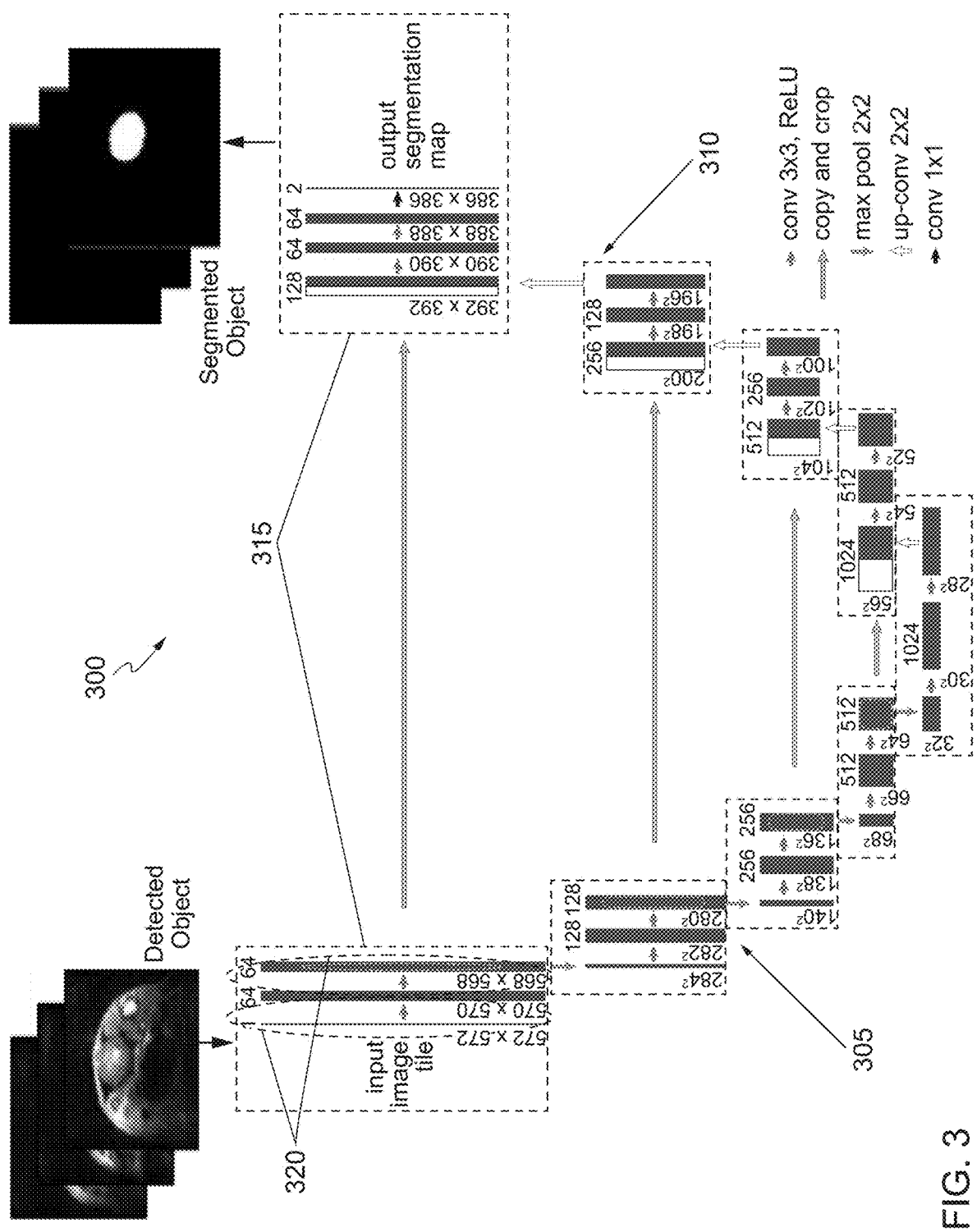
FIG. 3 shows an exemplary U-Net according to various embodiments.

In an exemplary embodiment shown in FIG. 3, a modified 3D U-Net 300 extracts features from input images (e.g., cropped portion(s) of the second image) individually, detected an object of interest within the input images, generates a three-dimensional segmentation mask around the shape of the object of interest, and outputs the input images with the three-dimensional segmentation mask around the shape of the object of interest. The 3D U-Net 300 includes a contracting path 305 and an expansive path 310, which gives it a u-shaped architecture. The contracting path 305 is a CNN network that includes repeated application of convolutions (e.g., 3×3×3 convolutions (unpadded convolutions)), each followed by a rectified linear unit (ReLU) and a max pooling operation (e.g., a 2×2×2 max pooling with stride 2 in each direction) for downsampling. The input for a convolutional operation is a three-dimensional volume (i.e., the input images of size n×n×channels, where n is a number of input features) and a set of 'k' filters (also called as kernels or feature extractors) each one of size (f×f×f channels, where f is any number, for example, 3 or 5). The output of a convolutional operation is also a three-dimensional volume (also called an output image or feature map) of size (m×m×k, where M is a number of output features and k is the convolutional kernel size).

Each block 315 of a contraction path 315 includes one or more convolutional layers (denoted by gray horizontal arrows), and the number of feature channels changes, e.g., from 1→64 (e.g., in the first process depending on the starting number of channels), as convolution processes will increase the depth of the input image. The gray arrow pointing down between each block 315 is the max pooling process which halves down the size of the input image. At each downsampling step or pooling operation, the number of feature channels may be doubled. During the contraction, the spatial information of the image data is reduced while feature information is increased. Thus before pooling, the information which was present in, e.g., a 572×572 image, after pooling, (almost) the same information is now present in, e.g., a 284×284 image. Now when the convolution operation is applied again in a subsequent process or layer, the filters in the subsequent process or layer will be able to see larger context, i.e., as the input image progresses deeper into the network, the size of the input image reduces however the receptive field increases (receptive field (context) is the area of the input image that the kernel or filter covers at any given point of time). Once the blocks 315 are performed, two more convolutions are performed in block 320 but with no max pooling. The image after block 320 has been resized to e.g., 28×28×1024 (this size is merely illustrative and the size at the end of process 320 could be different depending on the starting size of the input image—size n×n×channels).

The expansive path 310 is a CNN network that combines the feature and spatial information from the contracting path 305 (upsampling of the feature map from the contracting path 305). As described herein, the output of three-dimensional segmentation is not just a class label or bounding box parameters. Instead, the output (the three-dimensional segmentation mask) is a complete image (e.g., a high resolution image) in which all the voxels are classified. If a regular convolutional network with pooling layers and dense layers was used, the CNN network would lose the "where" information and only retain the "what" information which is not acceptable for image segmentation. In the instance of image segmentation, both "what" as well as "where" information are used. Thus, the image is upsampled to convert a low resolution image to a high resolution image to recover the "where" information. Transposed convolution represented by the white arrow pointing up is an exemplary upsampling technic that may be used in the expansive path 310 for upsampling of the feature map and expanding the size of images.

After the transposed convolution at block 325, the image is upsized, e.g., from 28×28×1024→56×56×512 via up-convolution (upsampling operators) of 2×2×2 by strides of two in each dimension, and then, the image is concatenated with the corresponding image from the contracting path (see the horizontal gray bar 330 from the contracting path 305) and together makes an image of e.g., size 56×56×1024. The reason for the concatenation is to combine the information from the previous layers (i.e., the high-resolution features from the contracting path 305 are combined with the upsampled output from the expansive path 310) in order to get a more precise prediction. This process continues as a sequence of up-convolutions that halves the number of channels, concatenations with a correspondingly cropped feature map from the contracting path 305, repeated application of convolutions (e.g., two 3×3×3 convolutions) that are each followed by a rectified linear unit (ReLU), and a final convolution in block 335 (e.g., one 1×1×1 convolution) to generate a multi-channel segmentation as a three-dimensional segmentation mask. In order to localize, the U-Net 300 uses the valid part of each convolution without any fully connected layers, i.e., the segmentation map only contains the voxels for which the full context is available in the input image, and uses skip connections that link the context features learned during a contracting block and the localization features learned in an expansion block.

In conventional neural network with a 3D U-Net architecture, the output and the ground truth labels are typically compared using a softmax function with cross-entropy loss. While these networks demonstrate improved segmentation performance over traditional CNNs, they do not immediately translate to small foreground objects, small sample sizes, and anisotropic resolution in medical imaging datasets. In order to address these problems and others, the 3D U-Net 300 is constructed to include a reduced number of parameters and/or kernels relative to conventional 3D U-Nets (total of 2,784 kernels and 19,069,955 learnable parameters—see, e.g., Ö. Çiçek, A. Abdulkadir, S. S. Lienkamp, T. Brox, and O. Ronneberger, "3D U-Net: learning dense volumetric segmentation from sparse annotation," in *International conference on medical image computing and computer-assisted intervention*, 2016: Springer, pp. 424-432). Specifically, a number of weights, a number of layers, and/or an overall width of the network is reduced to decrease network complexity and avoid an over-parametrization problem. In some instances, the number of kernels per each convolutional and deconvolutional layer is halved as compared to the conventional 3D U-Net. This subsequently reduces the number of learnable parameters of each convolutional and deconvolutional layer of the 3D U-Net 300, therefore the 3D U-Net 300 has 9,534,978 learnable parameters as compared to a conventional 3D U-Net with 19,069,955 learnable parameters. In terms of kernels, the total number of kernels is reduced from 2,784 in the conventional 3D U-Net to 1,392 kernels in the 3D U-Net 300. In some instances, a total number of the learnable parameters for the 3D U-Net 300 is reduced to between 5,000,000 and 12,000,000 learnable parameters. In some instances, a total number of the kernels for the 3D U-Net 300 is reduced to between 800 and 1,700 kernels. Reduction of parameters and/or kernels is advantageous as it enables the model to handle a smaller sample size (i.e., cropped portion(s) of the second DTI parametric map) more efficiently.

Moreover, the 3D U-Net 300 is constructed for volumetric segmentation using a weighted loss function. Specifically, the metric used for evaluating segmentation performance was the Dice similarity coefficient (DSC, Equation 1). Therefore, to train 3D U-Net 300 with the objective of maximizing the DSC, the DSC was minimized for all the images (Equation 2). Also, due to unbalanced distribution of background and object of interest in the foreground in the volumetric images, a weighted loss function was used, which is referred to herein as the Dice loss (Equation 3) where weights for the frequently seen background are reduced and weights for the object of interest in the foreground are increased to reach a balanced influence of foreground and background voxels on the loss.

$$\text{Dice} = \frac{2\sum_{i=1}^{N} p_i q_i}{\sum_{i=1}^{N} p_i^2 + \sum_{i=1}^{N} q_i^2} \quad (1)$$

$$\text{Dice Loss} = 1 - \frac{2\sum_{i=1}^{N} p_i q_i}{\sum_{i=1}^{N} p_i^2 + \sum_{i=1}^{N} q_i^2} \quad (2)$$

$$w_l = \frac{1}{\sum_{i=1}^{N} q_i^2} \quad (3)$$

where N is the number of images, $p_i$ represents a predicted mask, and $q_i$ represents a ground truth mask corresponding to a target object.

As should be understood to those of ordinary skill in the art, the 3D U-Net 300 does not have to be incorporated into the overall computing environment 100 described with respect to FIG. 1 in order to implement object segmentation in accordance with aspects of the present disclosure. Instead, various types of models can be used for object segmentation (e.g., a CNN, Resnet, a typical U-Net, a V-Net, a SSD network, or a recurrent neural network RNN, etc.) so long as the type of models can be learned for object segmentation of medical images.

V. Techniques for Volumetric Segmentation

Figure 4:
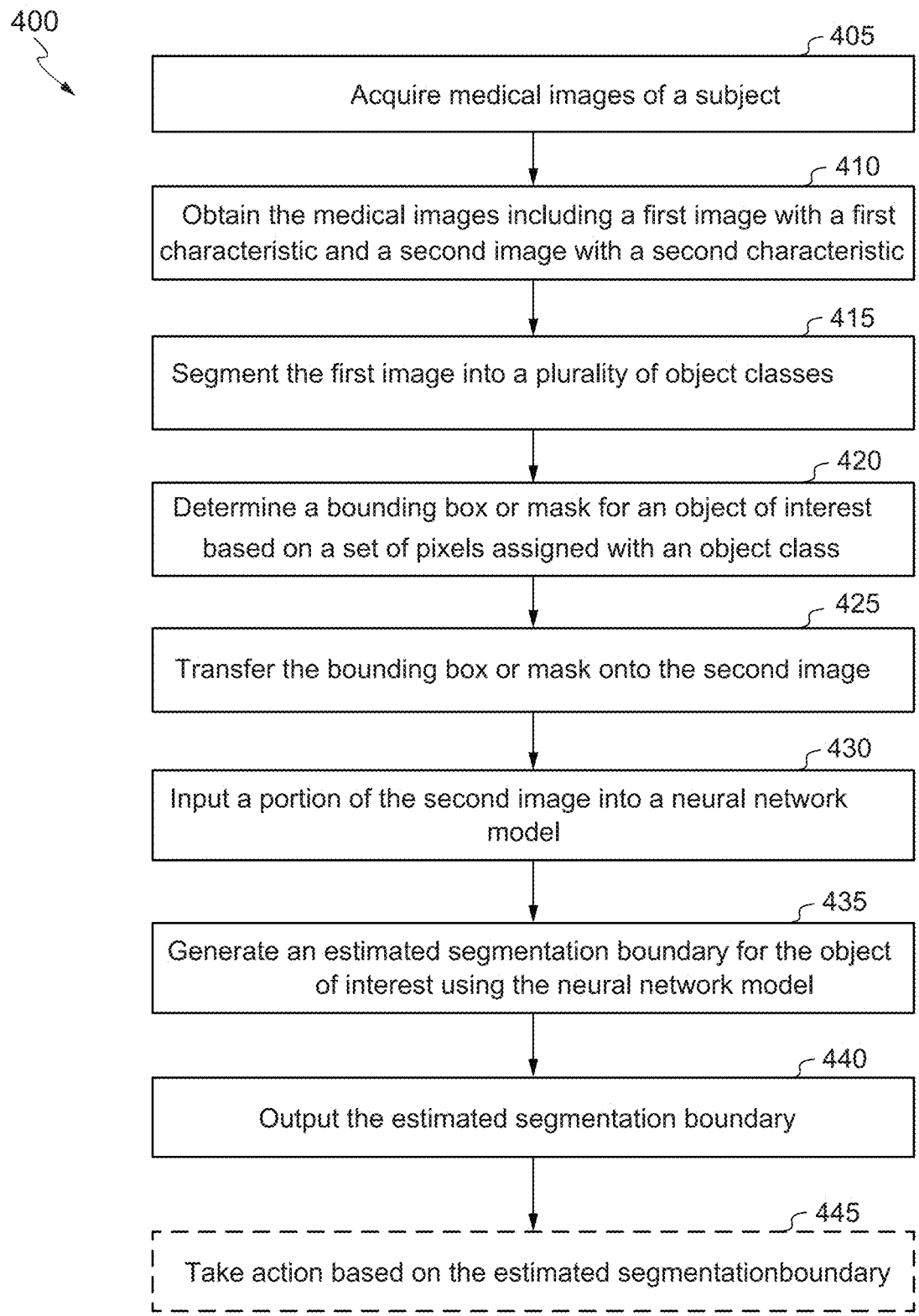
FIG. 4 shows a process for segmenting instances of an object of interest according to various embodiments.

FIG. 4 illustrates a flowchart for an exemplary process 400 for using the described multi-stage segmentation network to segment instances of an object of interest. Process 400 may be performed using one or more computing systems, models, and networks, as described in Section IV with respect to FIGS. 1-3.

Process 400 begins at block 405 where medical images are acquired of a subject. The medical images may depict a cephalic region, a chest region, an abdominal region, a pelvic region, and/or a region corresponding to a limb of the subject. The medical images are generated using one or more medical imaging modalities. For example, a user may operate one or more imaging systems that use the one or more medical imaging modalities to generate the medical images, as discussed in Section IV with respect to FIG. 1.

At block 410, medical images of the subject are obtained. For example, the medical images acquired in step 405 may be retrieved from a data storage device or the one or more medical imaging systems. The medical images include a first image having a first characteristic and a second image having a second characteristic. In some embodiments, the images are DTI parametric maps comprising a first measurement map (a first image having a first characteristic) and a second measurement map (a second image having a second characteristic). The first measurement map is different from the second measurement map. The DTI parametric maps are generated by applying supplemental MR gradients during acquisition of the MR image. For example, a user may input parameters for one or more diffusion gradients into an imaging system, and DTI parametric maps are generated by applying supplemental MR gradients during acquisition of the MR image based on the parameters for one or more diffusion gradients (the motion of protons during the application of the gradients affects the signal in the image). In some instances, a diffusion gradient is applied in more than one direction during acquisition of the MR image. In some instances, the first measurement map is a fractional anisotropy map and the second measurement map is a mean diffusivity map.

At block 415, objects within the first image are located and classified using a localization model. The classifying assigns sets of pixels or voxels of the first image into one or more of the plurality of object classes. Object classes may include a class corresponding to an object of interest (e.g., depending on a type of object of interest), one or more classes corresponding to different biological structures, one or more classes corresponding to different organs, and/or one or more classes corresponding to different tissues. For example, if an object of interest is a lesion, object classes may be defined for identifying lesions, blood vessels, and/or organs. The locating and classifying may be performed by the localization model using one or more clustering algorithms that assigns sets of pixels or voxels into one or more object classes of the plurality of object classes. In some instances, the one or more clustering algorithms include a k-means algorithm that assigns observations to clusters associated with the plurality of object classes. In some instances, the one or more clustering algorithms further include an expectation maximization algorithm that computes probabilities of cluster memberships based on one or more probability distributions. The k-means algorithm may be used to initialize the expectation maximization algorithm by estimating initial parameters for each object class of the plurality of object classes.

At block 420, a bounding box or segmentation mask is determined for an object of interest in the first image using the localization model. The bounding box or segmentation mask is determined for an object of interest based on sets of pixels or voxels assigned with an object class of the plurality of object classes. In order to determine the segmentation mask, a seed location of the object of interest is identified using the set of pixels assigned with the object class corresponding to the object of interest. The identified seed location is projected towards a z-axis in order to grow the seed location and determine the segmentation mask. The z-axis represents depth and the seed location is grown to fill the entire volume of the object mask in the third or final dimension. In some instances, a morphological closing and filling is additionally performed on the segmentation mask.

At block 425, the bounding box or the segmentation mask is transferred onto the second image to define a portion of the second image comprising the object of interest. Transferring the object mask includes projecting the bounding box or the segmentation mask in a slice direction onto a corresponding region of the image (portion of the second image comprising the object of interest) and/or overlaying the bounding box or the segmentation mask onto a corresponding region of the second image (portion of the second image comprising the object of interest). In some instances, the segmentation mask is projected onto two-dimensional slices of the second image, such that the boundaries of the segmentation mask within a two-dimensional space can be used to define a rectangular bounding box enclosing a region of interest corresponding to the detected object of interest. In some instances, the bounding box includes additional padding (e.g., padding of 5 pixels, 10 pixels, 15 pixels, etc.) to each edge of a perimeter of the segmentation mask in order to ensure an entirety of the region of interest is enclosed. In some instances, the second image is cropped based on the bounding box or segmentation mask plus an optional margin to generate the portion of the second image. Each cropped portion may further be resized (e.g., with additional padding) in order to maintain a uniform size.

In some embodiments, the portion of the second image is transmitted to a deep super resolution neural network for preprocessing. The deep super resolution neural network may be (for example) a convolutional neural network, a residual neural network, an attention-based neural network, and/or a recursive convolutional neural network. The deep super resolution neural network processes the transmitted portion of the second image in order to improve image spatial resolution (e.g., an enlargement and/or a refining of image details) of the portion of the second image.

At block 430, the portion of the second image is input into a three-dimensional neural network model constructed for volumetric segmentation using a weighted loss function (e.g., a modified 3D U-Net model). In some instances, the weighted loss function is a weighted Dice loss function. The three-dimensional neural network model comprises a plurality of parameters trained using a set of training data. A number of the plurality of model parameters may be reduced relative to a standard three-dimensional U-Net architecture. The set of training data may comprise: a plurality of images with annotations associated with segmentation boundaries around objects of interest; and a plurality of additional images with annotations associated with segmentation boundaries around objects of interest. In some instances, the plurality of additional images are artificially generated by matching image histograms from the plurality of images to image histograms from a plurality of reference maps (e.g., maps obtain from other regions of subjects). The plurality of model parameters are identified using the set of training data based on minimizing the weighted loss function. The three-dimensional neural network model further comprises a plurality of kernels, and the number of kernels may be reduced relative to a standard three-dimensional U-Net architecture.

At block 435, the three-dimensional neural network model segments the portion of the second images. The segmenting includes generating an estimated segmentation boundary for the object of interest using identified features. For example, the segmenting may include assessing features such as variations in pixel intensities for each cropped portion to identify a set of edges and/or contours corresponding to the object of interest, and generating an estimated segmentation boundary for the object of interest using the identified set of edges and/or contours. The estimated segmentation boundary may represent a three-dimensional perimeter of the object of interest. In some instances, three-dimensional neural network model may also determine a classification of the object of interest. For example, objects corresponding to lesions may be classified based on its type or a location within a subject, such as a lung lesion, liver lesion, and/or a pancreatic lesion. As another example, objects corresponding to an organ and/or tissue may be classified as healthy, inflamed, fibrotic, necrotic, and/or cast filled.

At block 440 the portion of the second image with the estimated segmentation boundary around the object of interest is outputted. In some instances, the portion of the second image is provided. For example, the portion of the second image may be stored in a storage device and/or displayed on a user device.

At optional block 445, action is taken based on the estimated segmentation boundary around the object of interest. In some instances, the action includes determining a size, surface area, and/or volume of the object of interest based on the estimated segmentation boundary around the object of interest. In some instances, (i) the portion of the second image with the estimated segmentation boundary around the object of interest, and/or (ii) a size, surface area, and/or volume of the object of interest, is provided. For example, (i) the portion of the second image with the estimated segmentation boundary around the object of interest, and/or (ii) a size, surface area, and/or volume of the object of interest, may be stored in a storage device and/or displayed on a user device. A user may receive or obtain (i) the portion of the second image with the estimated segmentation boundary around the object of interest, and/or (ii) a size, surface area, and/or volume of the object of interest. In other instances, (i) the portion of the second image with the estimated segmentation boundary around the object of interest, and/or (ii) a size, surface area, and/or volume of the object of interest are used for quantifying an image metric such as image intensity. For example in PET there is standardized uptake value (SUV) or in MRI there is a diffusivity, T2, T1, etc. that correlate with certain image metrics such as image intensity, and thus quantification of the image metric could be used for determining values/metrics such as SUV specific to the object of interest.

In some instances, the action includes determining a diagnosis of the subject using: (i) the portion of the second image with the estimated segmentation boundary around the object of interest, and/or (ii) a size, surface area, and/or volume of the object of interest. In some instances, the action includes administering, by a user, a treatment with a compound (e.g., to the subject) based on (i) the portion of the second image with the estimated segmentation boundary around the object of interest, (ii) a size, surface area, and/or volume of the object of interest, and/or (iii) the diagnosis of the subject. In other instances, the action includes determining a treatment plan based on (i) the portion of the second image with the estimated segmentation boundary around the object of interest, (ii) a size, surface area, and/or volume of the object of interest, and/or (iii) the diagnosis of the subject, such that a dosage for a drug may be calculated based on the size, surface area, and/or volume of the object of interest. In some instances, the action includes determining if a treatment is effective or if a dosage for a drug needs to be adjusted based on a comparison of the a size, surface area, and/or volume corresponding to the object of interest for a first time point to a size, surface area, and/or volume corresponding to the object of interest for a second time point.

VI. Examples

The systems and methods implemented in various embodiments may be better understood by referring to the following examples.

VI.A. Example 1. —Kidney Segmentation

Kidney segmentation using 3D U-Net localized with Expectation Maximization.

VI.A.i. Background

Kidney function and activity is highly dependent on kidney volume in a variety of diseases such as polycystic kidney disease, lupus nephritis, renal parenchymal disease, and kidney graft rejection. Automatic evaluation of the kidney through imaging can be used to determine a diagnosis, prognosis, and/or treatment plan for a subject. In vivo imaging modalities offer unique strengths and limitations. MRI, in particular, does not have ionizing radiation, is not operator dependent, and has good tissue contrast that enables kidney segmentation and volume related information. Traditional methods have been used to evaluate the kidney more locally, such as manual tracing, stereology, or general image processing. These methods can be labor intensive or inconsistent. To address these issues, an integrated deep learning model was utilized to segment the kidney.

Deep learning segmentation networks have been used for semantic segmentation of large biomedical image datasets. Although these networks offer state-of-the-art performance, they suffer from high computational cost and memory consumption, which limits their field-of-view and depth. Hence, these networks can be particularly problematic for segmenting small objects in limited images typically found in MRI studies. MRI tends to include a large field-of-view or background for preventing aliasing artifacts. When the background represents a significant portion, the network may not be optimally trained to segment the foreground object of interest. Thus, an alternative strategy is needed to reduce the parameters of a large 3D segmentation network, avoid overfitting, and improve network performance.

First, to address the issue of the background effect, a derived MRI contrast mechanism (use of DTI) was incorporated for the localization step prior to learned segmentation. Second, a 3D U-Net was modified to reduce the number of parameters and incorporated a Dice loss function for the segmentation. Third, augmentation and MRI histogram matching were incorporated to increase the number of training datasets. Additionally, these technique were in some instances applied on super resolved images of the dataset to determine whether enhanced images can improve segmentation performance. These techniques were implemented on preclinical MRI using an animal model of lupus nephritis.

VI.A.ii. Animal Model and Data Acquisition

Fifteen friend Virus B female mice were used for this study, where 8 were used for the lupus nephritis (LN) disease group and 7 for the control group. Animals were imaged every 2 weeks for 4 time points starting at 13 weeks of age. At each time point, multiple MRI datasets were acquired for each animal. A total of 196 3D MR images were acquired for this study. All images were manually segmented by a single user. Kidneys were outlined slice by slice for the entire image volume using Amira (Thermo Fisher Scientific, Hillsboro, OR). During MR imaging, animals were anesthetized under isoflurane, breathing freely, and maintained at 37 C. MRI was performed on a Bruker 7T (Billerica, MA) with a volume transmit and cryogenic surface receive coil. A custom in vivo holder was constructed with 3D printing (Stratasys Dimension) to provide secure positioning of the brain and spine. MRI diffusion tensor imaging was performed (single-shot EPI) with individual local shims using the following parameters: TR=4 s, TE=42 ms, BW=250 kHz, diffusion directions=12. FOV=22×22 mm$^2$, encoding matrix=110×110, slices=15, image resolution=200×200 µm$^2$, slice thickness=1 mm, acquisition time=13 min. Diffusion tensor parametric maps were computed, which include: FA, MD, AD, and RD. FA and MD images were used for the integrated semantic segmentation algorithm.

VI.A.iii. Stage 1: Localization with EM

The FA images were used for the localization step. The FA images were segmented using EM, which was initialized with K-means (12 classes) heuristically. The general kidney vicinity was isolated using one of the tissue classes and used as the detected object. These parameters were used for the algorithm: number of iterations for convergence=7 and Markov random field smoothing factor=0.05.

VI.A.iv. Data Augmentation

MD images were histogram matched with a mouse brain dataset to generate new datasets (FIG. 2). Both datasets were rotated 90°, flipped left-to-right, and flipped up-and-down. Data augmentation was done only for training set, to make sure the network is validated on a completely unseen data. The total number of acquired datasets was n=196. With augmentation, the training dataset increased from n=180 to n=1800, leaving the test dataset to n=16. The training and testing split was done animal-wise, where each time one animal was kept out for testing and the rest were used for training.

VI.A.v. Stage 2: Deep Semantic Segmentation

The metric used for evaluating segmentation performance was the Dice similarity coefficient (DSC, Equation 1). Therefore, to train a 3D U-Net with the objective of maximizing the DSC, the DSC was minimized for all the images (Equation 2). Also, due to unbalanced distribution of background and kidney in the volumetric images, a weighted loss function was used (the Dice loss, Equation 3). To alleviate the background effect, the EM segmentation masks were projected in the slice direction. The boundaries of each projected EM segmentation mask was used to define a rectangular box for object detection. The defined box was enlarged by 5 pixels on all sides to ensure coverage of the kidney. The 3D U-Net was trained and tested on the MD images inside the detected area. The same detected area was used for the super-resolved images. Since the cropped object had an arbitrary size in the first two dimensions based on the 2D projected mask, all cropped images were resized to 64×64×16 for the original resolution images and resized to 64×64×64 for the super-resolved images.

VI.A.vi. Super Resolution

MD images were super resolved in the through-plane direction to improve spatial resolution. The original matrix of 110×110×15 were resolved 5× to give a resultant matrix of 110×110×75. Images were enhanced using a deep super resolution neural network.

VI.A.vii. Results

Figure 5A:
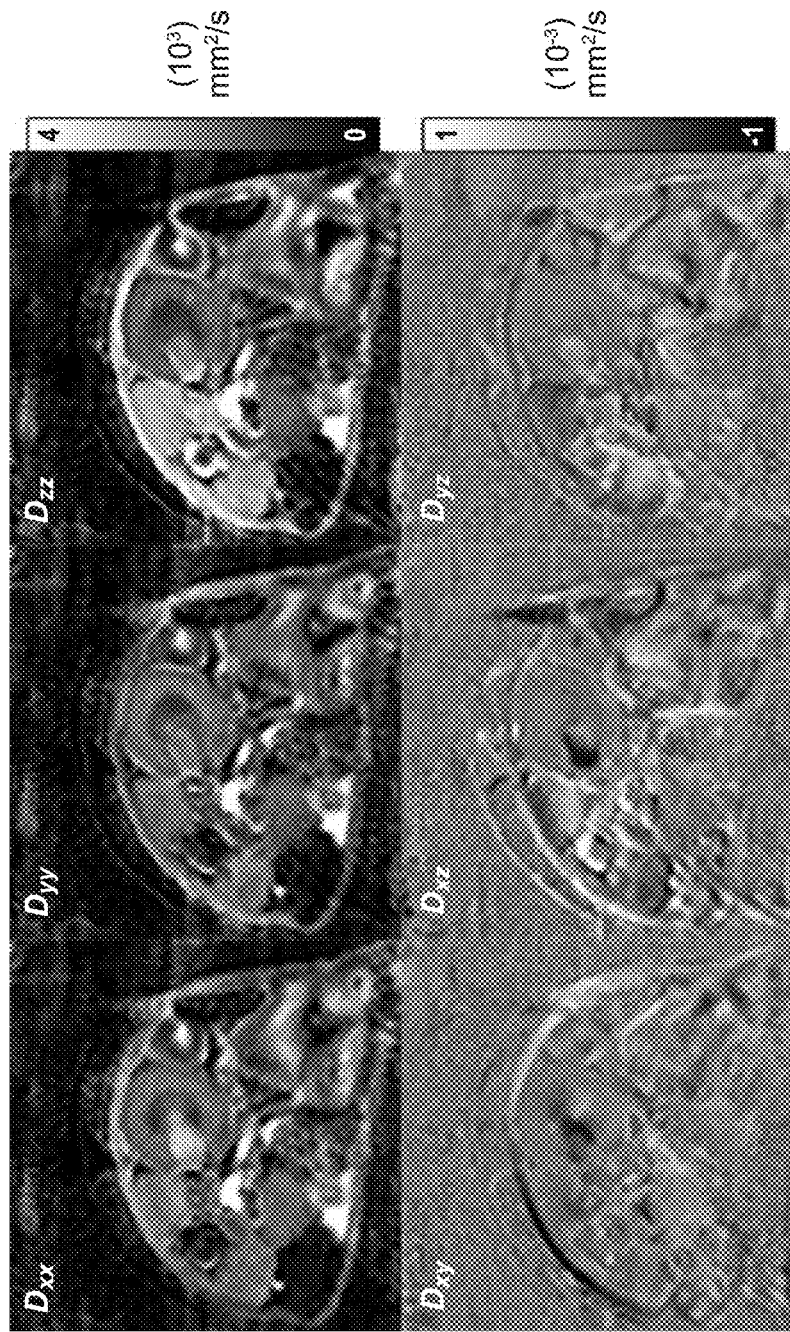
FIG. 5A shows diffusion tensor elements according to various embodiments.
Figure 5B:
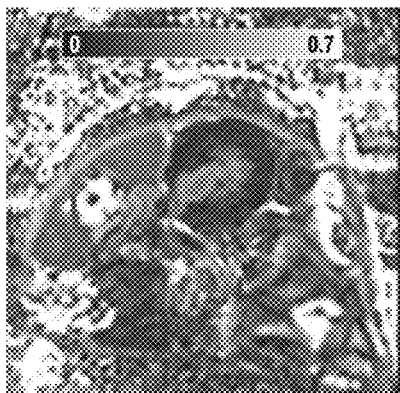
FIG. 5B shows a fractional anisotropy image used for expectation maximization (EM) segmentation (12 classes) and object detection steps according to various embodiments.
Figure 5B:
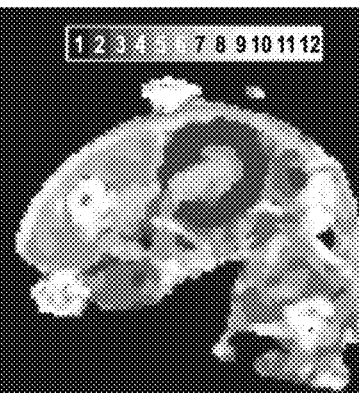
Figure 5B:
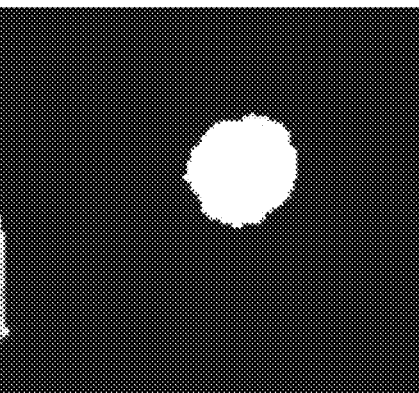
Figure 5C:
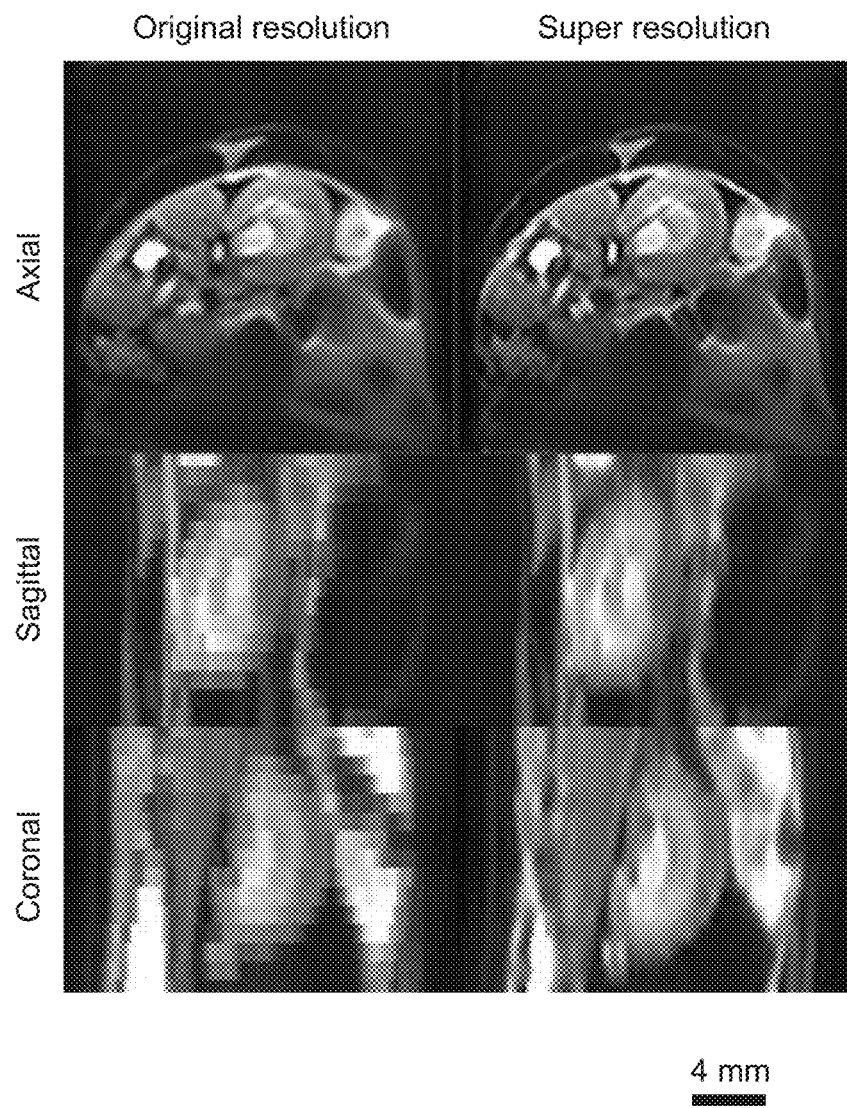
FIG. 5C shows super resolved images in the slice direction according to various embodiments.
Figures 6A, 6B, 6C, 6D, 6E:
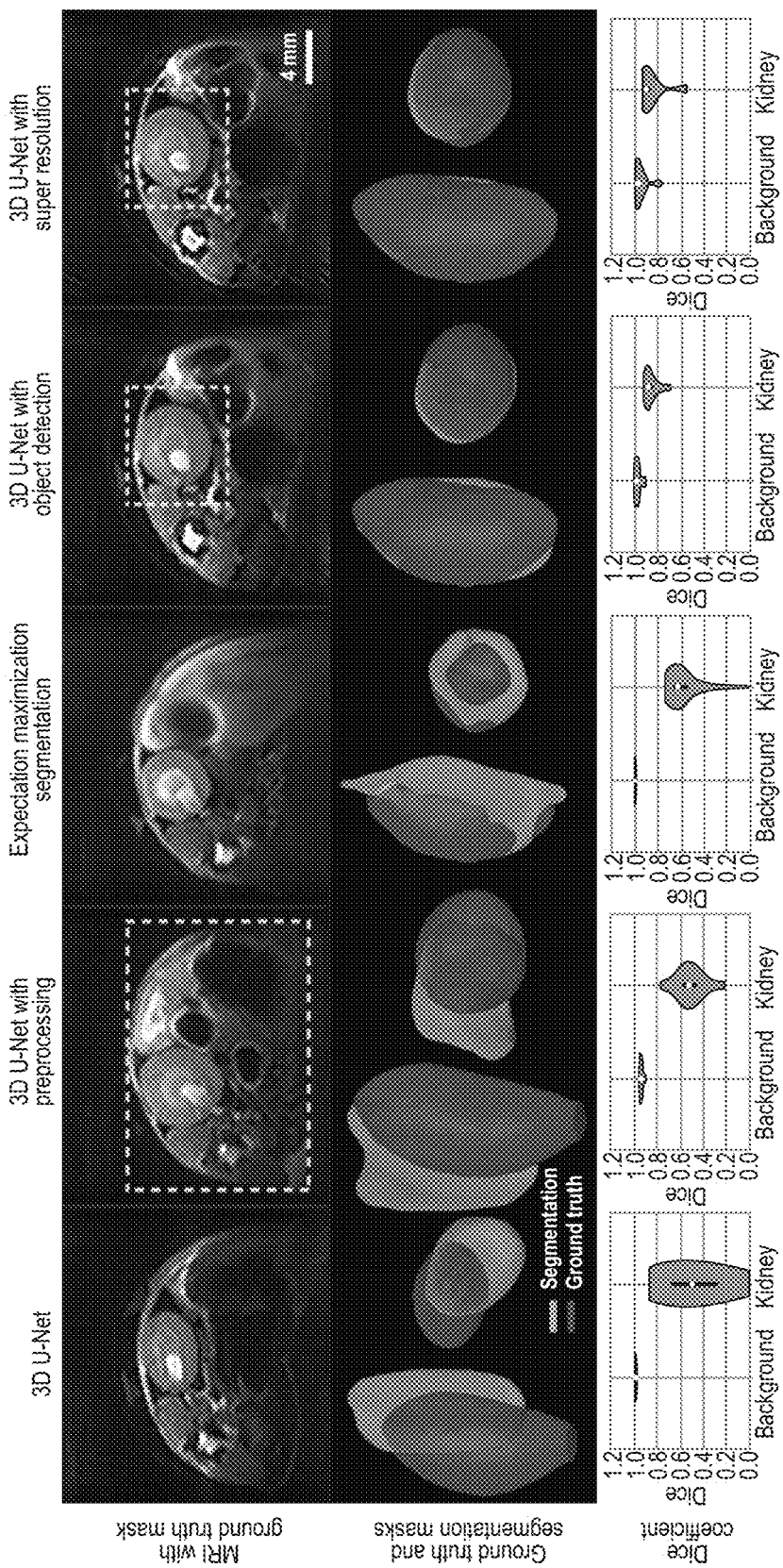
FIGS. 6A-6E show segmentation results using various strategies.

FIG. 5A shows the six elements of the diffusion tensor. The changing diffusion contrast is most noticeable in the inner and outer medullary regions. The changing contrast is noticeable in the diagonal ($D_{xx}$, $D_{yy}$, $D_{zz}$) and off-diagonal elements ($D_{xy}$, $D_{xz}$, $D_{yz}$). Consequently, the contrast does not change in the cortex, thus resulting in a very low FA (FIG. 5B). This low FA allowed the kidney to be segmented from the background. MR images were super resolved in the through-plane direction as shown in FIG. 5C. The improvements are most obvious in the sagittal and coronal directions. In-plane resolution is minimally affected as shown in the axial slice (FIG. 5C). FIG. 6A shows the results of training the 3D U-Net on the MD images, without any preprocessing. The DSC plot shows a uniform distribution with a mean of 0.49. In FIG. 6B the abdominal area is detected as foreground with connected component analysis and cropped using the MD images. The DSC plot displays a normal distribution with a mean of 0.52. FIG. 6C shows the results using EM segmentation alone. A mean DSC of 0.65 was achieved. FIG. 6D represents the results of the integrated strategy: first the kidney was detected using EM segmentation on FA images, then the 3D U-Net was trained on the detected kidney area from MD images. The average DSC of this approach was 0.88. The DSC plot of semantic segmentation with super-resolved MD images (FIG. 6E) is fairly similar to semantic segmentation at the original resolution (FIG. 6D). Here, the average DSC was 0.86. The results are summarized in Table 1 with additional comparison metrics, such as volume difference (VD) and positive predictive value (PPV).

TABLE 1 mean and standard deviation of segmentation results using DSC, VD, and PPV. The best value for each method is shown in bold.

| Method | DSC | VD | PPV |
| --- | --- | --- | --- |
| 3D U-Net | 0.49 ± 0.28 | 0.36 ± 0.2 | 0.67 ± 0.08 |
| CC + 3D U-Net | 0.52 ± 0.21 | 0.31 ± 0.17 | 0.71 ± 0.07 |
| EM | 0.65 ± 0.23 | 0.16 ± 0.15 | 0.76 ± 0.07 |
| Proposed | 0.88 ± 0.10 | 0.09 ± 0.05 | 0.94 ± 0.05 |
| Proposed + SR | 0.86 ± 0.12 | 0.08 ± 0.05 | 0.93 ± 0.05 |

VI.A.viii. Discussion and Conclusion

This example demonstrates the integration of EM based localization and 3D U-Net for kidney segmentation. The localization step led to a significantly improved result of the deep learning method. It was also demonstrated that while the EM segmentation lead to improvement in performance of deep learning, the EM segmentation method alone performed poorly. The EM segmentation method isolated the kidney in the central slice, however, it did not preserve the joint representation of kidney volume. Thus, the central slice was used for all slices across the volume as the detected rectangular object. A weighted Dice loss can be significant for the error minimization and balance of the object and background. Without the localization step, however it was found that the performance did not significantly increase with the inclusion of a weighted Dice loss. Consequently, the background contained objects and organs that appeared similar to the kidney that the 3D U-Net alone could not distinguish.

The approach presented in this example reduced the background effect and decreased the complexity of the data. Consequently, the complexity of the network can be decreased by reducing the number of kernels per convolutional layer by at least one half. In present study, a DSC of 0.88 was achieved with a limited MRI dataset of n=196.

VII. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method for segmenting objects within medical images, comprising:

obtaining medical images of a subject, the medical images include a first image having a first characteristic and a second image having a second characteristic, wherein the medical images are generated using one or more medical imaging modalities;

locating and classifying, using a localization model, objects within the first image into a plurality of object classes, where the classifying assigns sets of pixels or voxels of the first, image into one or more of the plurality of object classes;

determining, using the localization model, a bounding box or segmentation mask for an object of interest within the first image based on sets of pixels or voxels assigned with an object class of the plurality of object classes;

transferring the bounding box or the segmentation mask onto the second image to define a portion of the second image comprising the object of interest;

inputting the portion of the second image into a three-dimensional neural network model constructed for volumetric segmentation using a weighted loss function, wherein the weighted loss function includes variables configured to compensate for an imbalance between background and foreground of the portion of the second image, and wherein the three-dimensional neural network model comprises a plurality of model parameters identified using a set of training data comprising:

a plurality of medical images with annotations associated with segmentation boundaries around objects of interest; and a plurality of additional medical images with annotations associated with segmentation boundaries around objects of interest, wherein the plurality of additional medical images is artificially generated by matching image histograms from the plurality of medical images to image histograms from a plurality of reference maps, wherein the plurality of model parameters is identified using the set of training data based on minimizing the weighted loss function;

generating, using the three-dimensional neural network model, an estimated segmentation boundary around the object of interest; and outputting, using the three-dimensional neural network, the portion of the second image with the estimated segmentation boundary around the object of interest.

2. The method of claim 1, wherein the one or more medical imaging modalities comprise a first medical imaging modality and a second medical imaging modality that is the same or different from the first medical imaging modality, and wherein the first image is generated from the first medical imaging modality and the second image is generated from the second medical imaging modality.

3. The method of claim 1, wherein the segmentation mask is determined and the determining the segmentation mask comprises:

identifying a seed location of the object of interest using the sets of pixels or voxels assigned with the object class;

growing the seed location by projecting the seed location towards a z-axis representing depth of the segmentation mask; and determining the segmentation mask based on the projected seed location.

4. The method of claim 1, further comprising:

determining a size, surface area, and/or volume of the object of interest based on the estimated boundary around the object of interest; and providing: (i) the portion of the second image with the estimated segmentation boundary around the object of interest, and/or (ii) a size, surface area, and/or volume of the object of interest.

5. The method of claim 4, further comprising: determining, by a user, a diagnosis of the subject based on (i) the portion of the second image with the estimated segmentation boundary around the object of interest, and/or (ii) a size, surface area, and/or volume of the object of interest.

6. The method of claim 1, further comprising:

acquiring, by a user using an imaging system, the medical images of the subject, wherein the imaging system uses the one or more medical imaging modalities to generate the medical images;

determining a size, surface area, and/or volume of the object of interest based on the estimated segmentation boundary around the object of interest;

providing: (i) the portion of the second image with the estimated segmentation boundary around the object of interest, and/or (ii) the size, surface area, and/or volume of the object of interest;

receiving, by the user, (i) the portion of the second image with the estimated segmentation boundary around the object of interest, and/or (ii) the size, surface area, and/or volume of the object of interest; and determining, by the user, a diagnosis of the subject based on (i) the portion of the second image with the estimated segmentation boundary around the object of interest, and/or (ii) a size, surface area, and/or volume of the object of interest.

7. A system for segmenting objects within medical images, comprising:

one or more data processors; and a non-transitory computer readable storage medium containing instructions which, when executed on the one or more data processors, cause the one or more data processors to perform actions including:

obtaining medical images of a subject, the medical images include a first image having a first characteristic and a second image having a second characteristic, wherein the medical images are generated using one or more medical imaging modalities;

locating and classifying, using a localization model, objects within the first image into a plurality of object classes, where the classifying assigns sets of pixels or voxels of the first image into one or more of the plurality of object classes;

determining, using the localization model, a bounding box or segmentation mask for an object of interest within the first image based on sets of pixels or voxels assigned with an object class of the plurality of object classes;

transferring the bounding box or the segmentation mask onto the second image to define a portion of the second image comprising the object of interest;

inputting the portion of the second image into a three-dimensional neural network model constructed for volumetric segmentation using a weighted loss function, wherein the weighted loss function includes variables configured to compensate for an imbalance between background and foreground of the portion of the second image, and wherein the three-dimensional neural network model comprises a plurality of model parameters identified using a set of training data comprising:

a plurality of medical images with annotations associated with segmentation boundaries around objects of interest; and a plurality of additional medical images with annotations associated with segmentation boundaries around objects of interest, wherein the plurality of additional medical images is artificially generated by matching image histograms from the plurality of medical images to image histograms from a plurality of reference maps, wherein the plurality of model parameters is identified using the set of training data based on minimizing the weighted loss function:

generating, using the three-dimensional neural network model, an estimated segmentation boundary around the object of interest; and outputting, using the three-dimensional neural network, the portion of the second image with the estimated segmentation boundary around the object of interest.

8. The system of claim 7, wherein the one or more medical imaging modalities comprise a first medical imaging modality and a second medical imaging modality that is the same or different from the first medical imaging modality, and wherein the first image is generated from the first medical imaging modality and the second image is generated from the second medical imaging modality.

9. The system of claim 7, wherein the segmentation mask is determined and the determining the segmentation mask comprises:

identifying a seed location of the object of interest using the sets of pixels or voxels assigned with the object class;

growing the seed location by projecting the seed location towards a z-axis representing depth of the segmentation mask; and determining the segmentation mask based on, the projected seed location.

10. The system of claim 7, wherein the actions further include:
- determining a size, surface area, and/or volume of the object of interest based on the estimated boundary around the object of interest; and
- providing: (i) the portion of the second image with the estimated segmentation boundary around the object of interest, and/or (ii) a size, surface area, and/or volume of the object of interest.

11. The system of claim 10, wherein the actions further include:
- determining, by a user, a diagnosis of the subject based on (i) the portion of the second image with the estimated segmentation boundary around the object of interest, and/or (ii) a size, surface area, and/or volume of the object of interest.

12. The system of claim 7, wherein the actions further include:
- acquiring, by a user using an imaging system, the medical images of the subject, wherein the imaging system uses the one or more medical imaging modalities to generate the medical images;
- determining a size, surface area, and/or volume of the object of interest based on the estimated segmentation boundary around the object of interest;
- providing: (i) the portion of the second image with the estimated segmentation boundary around the object of interest, and/or (ii) the size, surface area, and/or volume of the object of interest;
- receiving, by the user, (i) the portion of the second image with the estimated segmentation boundary around the object of interest, and/or (ii) the size, surface area, and/or volume of the object of interest; and
- determining, by the user, a diagnosis of the subject based on (i) the portion of the second image with the estimated segmentation boundary around the object of interest, and/or (ii) a size, surface area, and/or volume of the object of interest.

13. A computer-program product tangibly embodied in a non-transitory machine-readable storage medium, including instructions configured to cause one or more data processors to perform actions including:
- obtaining medical images of a subject, the medical images include a first image having a first characteristic and a second image having a second characteristic, wherein the medical images are generated using one or more medical imaging modalities;
- locating and classifying, using a localization model, objects within the first image into a plurality of object classes, where the classifying assigns sets of pixels or voxels of the first image into one or more of the plurality of object classes;
- determining, using the localization model, a bounding box or segmentation mask for an object of interest within the first image based on sets of pixels or voxels assigned with an object class of the plurality of object classes;
- transferring the bounding box or the segmentation mask onto the second image to define a portion of the second image comprising the object of interest;
- inputting the portion of the second image into a three-dimensional neural network model constructed for volumetric segmentation using a weighted loss function, wherein the weighted loss function includes variables configured to compensate for an imbalance between background and foreground of the portion of the second image, and wherein the three-dimensional neural network model comprises a plurality of model parameters identified using a set of training data comprising:
  - a plurality of medical images with annotations associated with segmentation boundaries around objects of interest; and
  - a plurality of additional medical images with annotations associated with segmentation boundaries around objects of interest, wherein the plurality of additional medical images is artificially generated by matching image histograms from the plurality of medical images to image histograms from a plurality of reference maps,
- wherein the plurality of model parameters is identified using the set of training data based on minimizing the weighted loss function;
- generating, using the three-dimensional neural network model, an estimated segmentation boundary around the object of interest; and
- outputting, using the three-dimensional neural network, the portion of the second image with the estimated segmentation boundary around the object of interest.

14. The computer-program product of claim 13, wherein the one or more medical imaging modalities comprise a first medical imaging modality and a second medical imaging modality that is the same or different from the first medical imaging modality, and wherein the first image is generated from the first medical imaging modality and the second image is generated from the second medical imaging modality.

15. The computer-program product of claim 13, wherein the segmentation mask is determined and the determining the segmentation mask comprises:
- identifying a seed location of the object of interest using the sets of pixels or voxels assigned with the object class;
- growing the seed location by projecting the seed location towards a z-axis representing depth of the segmentation mask; and
- determining the segmentation mask based on the projected seed location.

16. The computer-program product of claim 13, wherein the actions further include:
- determining a size, surface area, and/or volume of the object of interest based on the estimated boundary around the object of interest; and
- providing: (i) the portion of the second image with the estimated segmentation boundary around the object of interest, and/or (ii) a size, surface area, and/or volume of the object of interest.

17. The computer-program product of claim 13, wherein the actions further include:
- acquiring, by a user using an imaging system, the medical images of the subject, wherein the imaging system uses the one or more medical imaging modalities to generate the medical images;
- determining a size, surface area, and/or volume of the object of interest based on the estimated segmentation boundary around the object of interest;
- providing: (i) the portion of the second image with the estimated segmentation boundary around the object of interest, and/or (ii) the size, surface area, and/or volume of the object of interest;
- receiving, by the user, (i) the portion of the second image with the estimated segmentation boundary around the object of interest, and/or (ii) the size, surface area, and/or volume of the object of interest; and determining, by the user, a diagnosis of the subject based on (i) the portion of the second image with the estimated segmentation boundary around the object of interest and/or (ii) a size, surface area, and/or volume of the object of interest.

* * * * *